United States Patent
Liang et al.

(10) Patent No.: US 6,831,770 B2
(45) Date of Patent: Dec. 14, 2004

(54) ELECTROPHORETIC DISPLAY AND NOVEL PROCESS FOR ITS MANUFACTURE

(75) Inventors: Rong-Chang Liang, Cupertino, CA (US); Scott C-J Tseng, Sunnyvale, CA (US); Zarng-Arh George Wu, San Jose, CA (US); Hongmei Zang, Sunnyvale, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 0 days.

(21) Appl. No.: 10/092,936

(22) Filed: Mar. 6, 2002

(65) Prior Publication Data

US 2003/0053190 A1 Mar. 20, 2003

Related U.S. Application Data

(63) Continuation-in-part of application No. 09/518,488, filed on Mar. 3, 2000.
(60) Provisional application No. 60/345,934, filed on Jan. 3, 2002.

(51) Int. Cl.[7] .......................... G02B 26/00; G09G 3/34; G03G 17/04
(52) U.S. Cl. .......................... 359/296; 345/107; 430/32
(58) Field of Search .................... 359/296, 237, 359/238, 290; 345/105, 107; 430/32, 34, 38; 204/450, 600

(56) References Cited

U.S. PATENT DOCUMENTS

| 3,229,607 | A | 1/1966 | Battaglia |
| 3,612,758 | A | 10/1971 | Evans |
| 3,668,106 | A | 6/1972 | Ota |
| 3,689,346 | A | 9/1972 | Rowland |
| 3,885,964 | A | 5/1975 | Nacci |
| 3,892,568 | A | 7/1975 | Ota et al. |
| 3,908,052 | A | 9/1975 | Sanders |

(List continued on next page.)

FOREIGN PATENT DOCUMENTS

| CA | 2340683 | 2/2001 |
| DE | 199 27 359.6 | 12/2000 |

(List continued on next page.)

OTHER PUBLICATIONS

Dalisa, A.L., "Electrophoretic Display Technology", *IEEE Trans. Electron Devices*—24:827–834 (1977).

(List continued on next page.)

*Primary Examiner*—Hung Xuan Dang
*Assistant Examiner*—Tuyen Tra
(74) *Attorney, Agent, or Firm*—Albert P. Halluin; Viola T. Kung; Howrey, Simon, Arnold & White, LLP

(57) ABSTRACT

This invention relates to an electrophoretic display comprising cells which are filled with charged particles dispersed in a solvent and are individually sealed with a polymeric sealing layer.

37 Claims, 12 Drawing Sheets

U.S. PATENT DOCUMENTS

| | | |
|---|---|---|
| 3,928,671 A | 12/1975 | Robusto et al. |
| 4,071,430 A | 1/1978 | Liebert |
| 4,093,534 A | 6/1978 | Carter et al. |
| 4,190,352 A | 2/1980 | Bruning |
| 4,285,801 A | 8/1981 | Chiang |
| 4,655,897 A | 4/1987 | DiSanto et al. |
| 4,680,103 A | 7/1987 | Beilin Solomon, I et al. |
| 4,741,604 A | 5/1988 | Kornfeld |
| 4,741,988 A * | 5/1988 | Van der Zande et al. ... 430/312 |
| 4,891,245 A | 1/1990 | Micale ................ 427/213.3 |
| 4,924,257 A | 5/1990 | Jain |
| 5,177,476 A | 1/1993 | DiSanto et al. |
| 5,200,120 A | 4/1993 | Sakai |
| 5,274,481 A | 12/1993 | Kim |
| 5,276,438 A | 1/1994 | DiSanto et al. |
| 5,279,511 A | 1/1994 | DiSanto et al. |
| 5,285,236 A | 2/1994 | Jain |
| 5,380,362 A | 1/1995 | Schubert |
| 5,398,041 A | 3/1995 | Hyatt |
| 5,403,518 A | 4/1995 | Schubert |
| 5,432,526 A | 7/1995 | Hyatt |
| 5,450,220 A | 9/1995 | Onishi et al. |
| 5,460,688 A | 10/1995 | DiSanto et al. |
| 5,573,711 A | 11/1996 | Hou et al. |
| 5,589,100 A | 12/1996 | Grasso et al. |
| 5,652,645 A | 7/1997 | Jain |
| 5,699,097 A * | 12/1997 | Takayama et al. ......... 347/171 |
| 5,731,860 A | 3/1998 | Harada et al. |
| 5,739,889 A | 4/1998 | Yamada et al. |
| 5,835,174 A | 11/1998 | Clikeman et al. |
| 5,843,333 A | 12/1998 | Hakemi |
| 5,872,552 A | 2/1999 | Gordon, II et al. |
| 5,877,848 A | 3/1999 | Gillette et al. |
| 5,895,541 A | 4/1999 | Kobayashi et al. |
| 5,914,806 A | 6/1999 | Gordon, II et al. |
| 5,930,026 A | 7/1999 | Jacobson et al. |
| 5,942,154 A | 8/1999 | Kim et al. |
| 5,956,112 A | 9/1999 | Fujimori et al. |
| 5,961,804 A | 10/1999 | Jacobson et al. |
| 5,976,405 A | 11/1999 | Clikeman et al. |
| 5,985,084 A | 11/1999 | Summersgill et al. |
| 5,995,190 A | 11/1999 | Nagae et al. |
| 6,017,584 A | 1/2000 | Albert et al. |
| 6,018,383 A | 1/2000 | Dunn et al. |
| 6,037,058 A | 3/2000 | Clikeman et al. |
| 6,064,508 A | 5/2000 | Forgette et al. ............ 359/267 |
| 6,067,185 A * | 5/2000 | Albert et al. ............... 359/296 |
| 6,113,810 A * | 9/2000 | Hou et al. .................. 252/572 |
| 6,113,836 A | 9/2000 | Sakai et al. |
| 6,120,588 A | 9/2000 | Jacobson |
| 6,120,839 A * | 9/2000 | Comiskey et al. ....... 427/213.3 |
| 6,120,946 A | 9/2000 | Johnson et al. |
| 6,166,797 A | 12/2000 | Bruzzone et al. |
| 6,172,798 B1 | 1/2001 | Albert et al. |
| 6,184,856 B1 * | 2/2001 | Gordon, II et al. ......... 345/107 |
| 6,191,250 B1 | 2/2001 | Aida et al. |
| 6,239,896 B1 | 5/2001 | Ikeda ....................... 359/240 |
| 6,312,304 B1 | 11/2001 | Duthaler et al. |
| 6,327,072 B1 | 12/2001 | Comiskey et al. |
| 6,337,761 B1 | 1/2002 | Rogers et al. |
| 6,392,785 B1 | 5/2002 | Albert et al. |
| 6,392,786 B1 | 5/2002 | Albert |
| 6,400,430 B2 | 6/2002 | Nakao et al. .................. 349/89 |
| 6,400,492 B1 | 6/2002 | Morita et al. |
| 6,512,626 B1 | 1/2003 | Schmidt .................... 359/296 |
| 6,514,328 B1 | 2/2003 | Katoh et al. |
| 6,525,865 B2 | 2/2003 | Katase |
| 2001/0009352 A1 | 7/2001 | Moore |
| 2002/0018043 A1 | 2/2002 | Nakanishi |
| 2002/0029969 A1 | 3/2002 | Yager et al. |
| 2002/0126249 A1 | 9/2002 | Liang et al. ................ 349/187 |
| 2002/0182544 A1 | 12/2002 | Chan-Park et al. ......... 430/311 |
| 2002/0188053 A1 | 12/2002 | Zang et al. |
| 2002/0196525 A1 | 12/2002 | Chen et al. |

FOREIGN PATENT DOCUMENTS

| | | |
|---|---|---|
| EP | 0990942 | 4/2000 |
| EP | 1065553 | 1/2001 |
| EP | 1089 118 A2 | 4/2001 |
| EP | 1195603 | 4/2002 |
| JP | 57104116 | 6/1982 |
| JP | 59171930 | 9/1984 |
| JP | 60-205452 | 10/1985 |
| JP | 1-86116 | 1/1990 |
| JP | 02223934 | 9/1990 |
| JP | 02284125 | 11/1990 |
| JP | 02284126 | 11/1990 |
| JP | 6242423 | 9/1994 |
| JP | 2000 035677 | 2/2000 |
| JP | 2000 075497 | 3/2000 |
| JP | 2001 042118 | 2/2001 |
| JP | 2001 056653 | 2/2001 |
| WO | WO 97/04398 | 2/1997 |
| WO | WO 98/57226 | 12/1998 |
| WO | WO 99/08151 | 2/1999 |
| WO | WO 99/53373 | 10/1999 |
| WO | WO 99/56171 | 11/1999 |
| WO | WO 00/03291 | 1/2000 |
| WO | WO 00/36649 | 6/2000 |
| WO | WO 00/60410 | 10/2000 |
| WO | WO 00/77571 | 12/2000 |
| WO | WO 01/67170 | 9/2001 |
| WO | WO 02/01281 | 1/2002 |

OTHER PUBLICATIONS

Harbour, J.R., et al., "Subdivided Electrophoretic Display," *Xerox Disclosure Journal, US, Xerox Corporation, Stamford, Conn.—4(6)*:705 Nov. 1979 (XP002123212) the whole document.

Harvey, T.G., "Replication techniques for micro–optics", *SPIE Proc.—3099*:76–82 (1997).

Mürau, P., et al., "The understanding and elimination of some suspension instabilities in an electrophoretic display", *J. Appl. Phys.—49*(9):4820–4829 (1978).

Slafer, W.D., et al., "Continuous Manufacturing of Thin Cover Sheet Optical Media", *SPIE Proc.—1663*:324–334 (1992).

Ota, et al., "Electrophoretic Image Display (EPID) Panel, "*Wireless Research Laboratory, Matsushita Electric Industrial Company, Ltd., Osaka, 571, Japan*, Feb. 7, 1973.

Andre W. L. Dalisa, "Electrophoretic Display Technology," *Philips Laboratories, Briarcliff Manor, NY 10510*, Revised Mar. 8, 1977.

Murau and Singer, "The understanding and elimination of some suspension instabilities in an electrophoretic display," *Philips Laboratories, Briarcliff Manor, NY 10510*, Apr. 10, 1978.

Nakamura, et al., "Development of Electrophoretic Display Using Microcapsulated Suspension," *NOK Corporation, Kanagawa, Japan & NOK Corporation, Ibaraki, Japan.*

J. C. Lewis, "Electrophoretic Displays," *Allen Clark Research Centre, The Plessey Company Limited, Caswell, Towcester, Northants, England.*

Comiskey, et al., "An electrophoretic ink for all–printed reflective electronic displays," *Letters to Nature*, MIT, The Media Laboratory, 20 Ames street, Cambridge, Ma 02139–4307, USA, May, 1998.

Drzaic, P.S., "Liquid Crystal Dispersions", The PDLC Paradigm, pp 1–9, (1995).

Singer, B. "X–Y Addressable Electrophoretic Display", Proc. SID–18 (3/4): 255–266 (1977).

Kazlas, P. et al., "SVGA Microencapsulated Electrophoretic Active Matrix Display for Information Applicances" *SID 01 Digest* 152–155 (2001).

Bryning et al., "Reverse–Emulsion Electrophoretic Display (REED)" *SID 98 Digest* 1018–1021 (1998).

Swanson et al., "High Performance Electrophoretic Displays" *SID 00 Digest* 29–31 (2000).

Inoue, S. et al., "High Resolution Microencapsulated Electrophoretic Display (EPD) Driven by Poly–Si TFTs With Four–Level Grayscale" *IEEE Transactions on Electron Devices* 49(8):1532–1539 (2002).

Matsuda Y. "Newly designed, high resolution, active matrix addressing in plane EPD" *IDW 02 EP2–3* 1341–1344 (2002).

Ota et al., "Developments in Electrophoretic Displays" *Proc. of SID* 18:243–254 (1977).

Kishi, E et al., "5.1 Development of In–Plane EPD", Canon Research Center, SID Digest, 2000, pp 24–27.

USSN 09/606,654, "Manufacturing Process for Electrophoretic Display", filed Jun. 28, 2000 (copy provided upon request).

Hopper et al., "An Electrophoretic Display, its Properties, Model and Addressing", IEEE Transactions on Electron Devices, 26(8):1148–1152 (1979).

USSN 09/518,488, filed Mar. 3, 2000 (to be provided upon request).

* cited by examiner

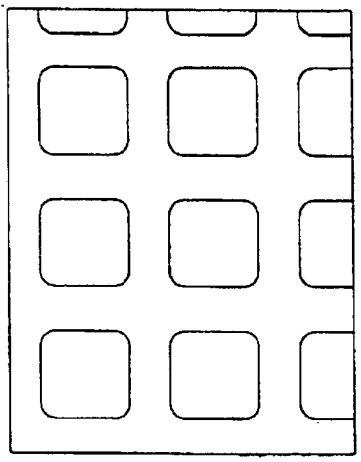
FIG. 4b
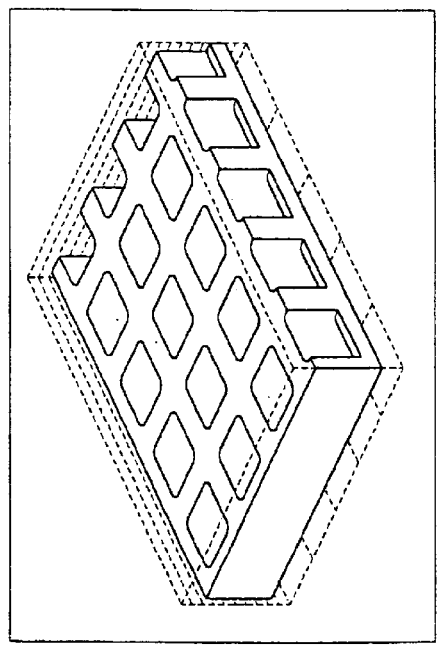
FIG. 4a
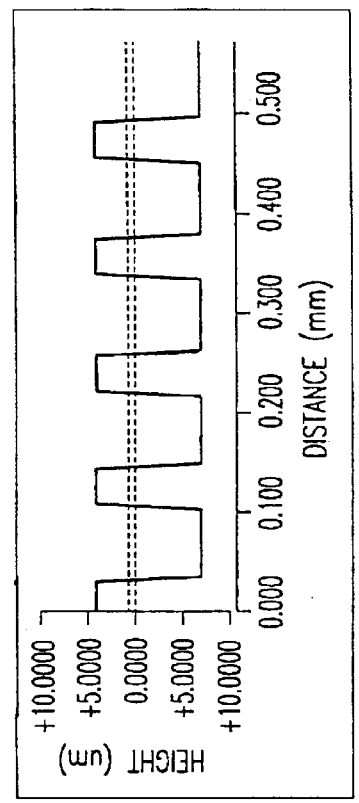
FIG. 4c
Figure 4

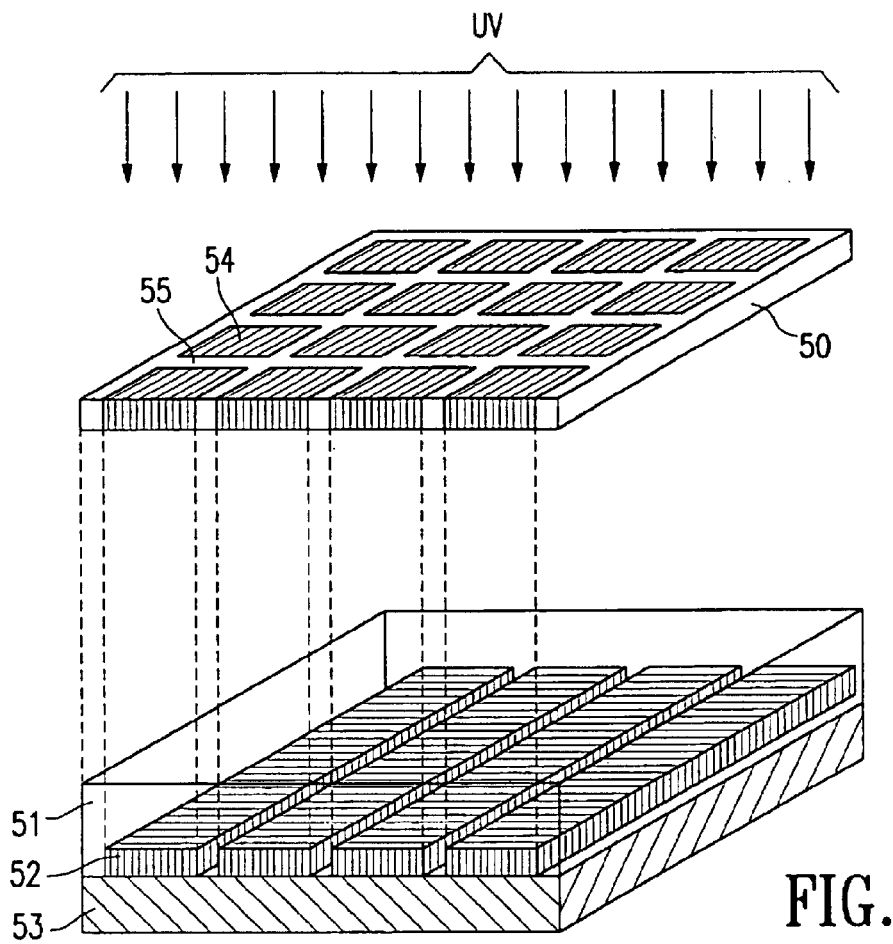
FIG. 5a1
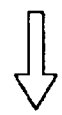
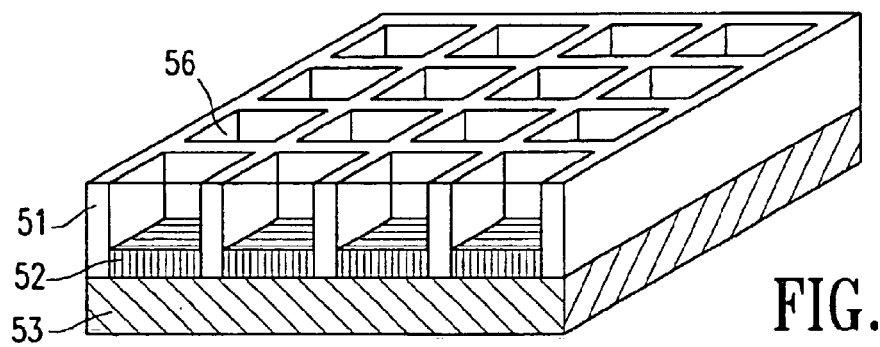
FIG. 5a2

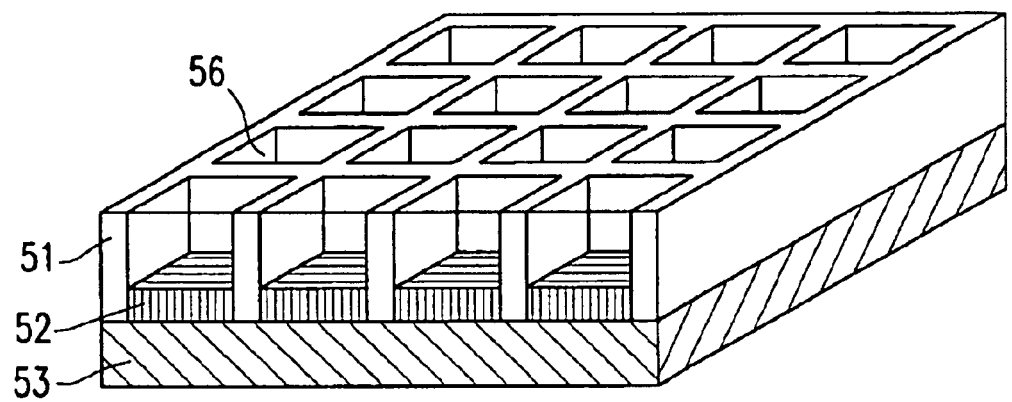
FIG. 5b2
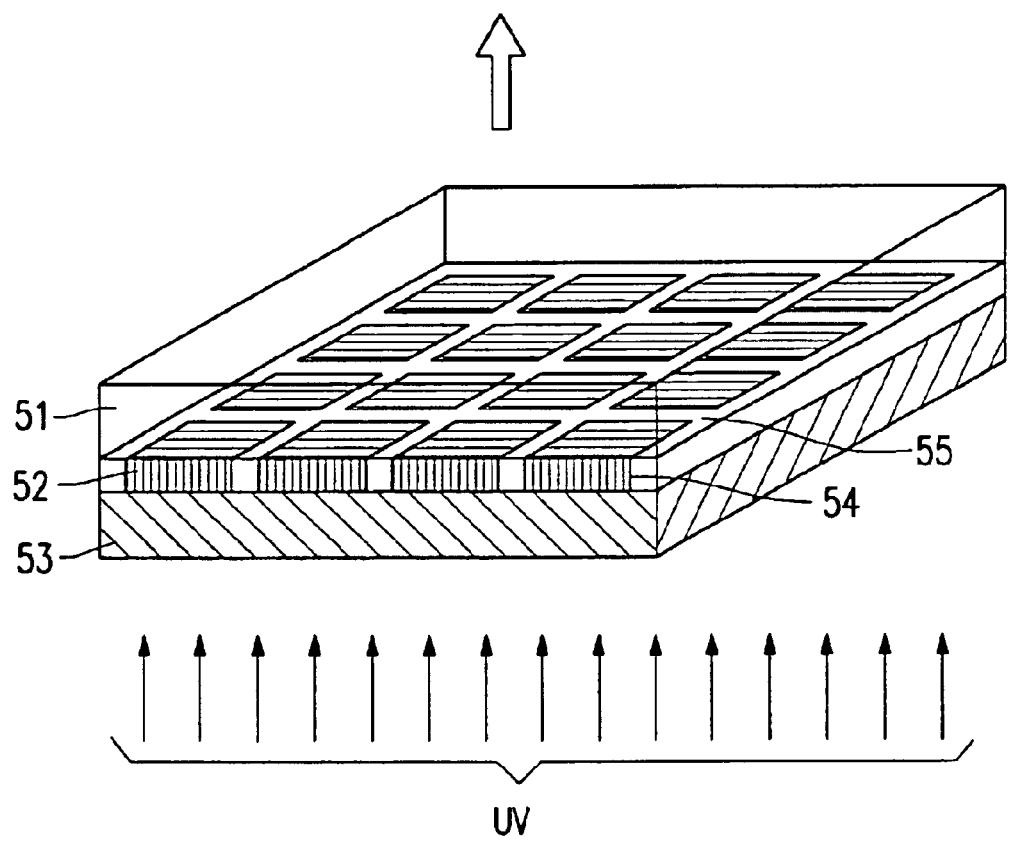
FIG. 5b1

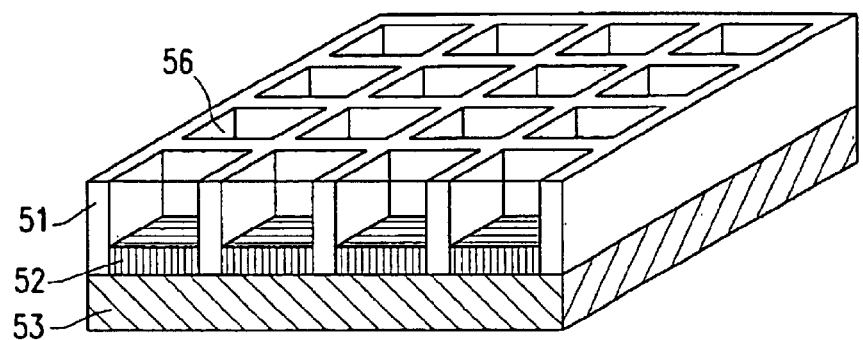
FIG. 5c2
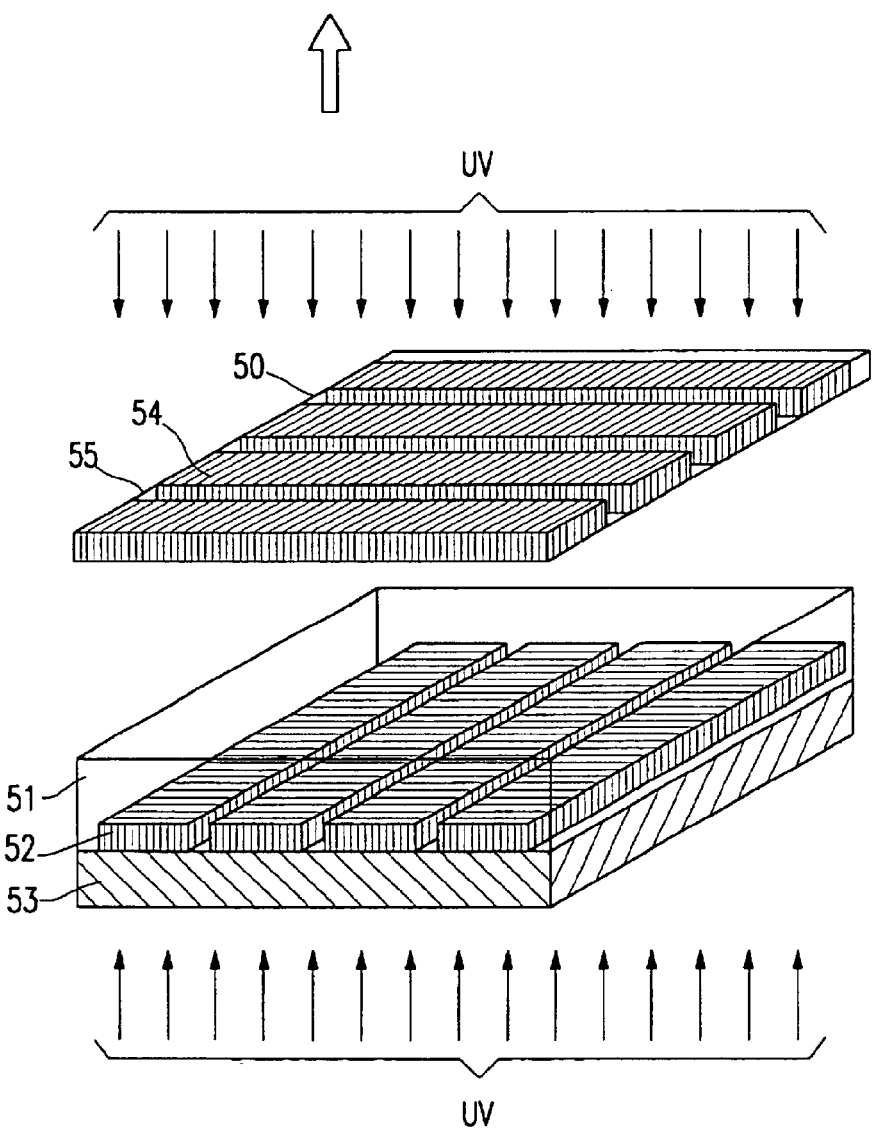
FIG. 5c1

ELECTROPHORETIC DISPLAY AND NOVEL PROCESS FOR ITS MANUFACTURE

This application is a continuation-in-part of U.S. Ser. No. 09/518,488, filed on Mar. 3, 2000 and also a continuation-in-part of U.S. Ser. No. 60/345,934, filed Jan. 3, 2002.

BACKGROUND OF THE INVENTION a) Field of the Invention

An invention directed to an electrophoretic display comprising isolated cells filled with charged pigment particles dispersed in a dielectric solvent. The filled cells are individually sealed with a polymeric sealing layer.

b) Description of Related Art

The electrophoretic display is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to prevent undesired movement of the particles, such as sedimentation, partitions between the two electrodes were proposed for dividing the space into smaller cells. However, in the case of partition-type electrophoretic displays, some difficulties were encountered in the formation of the partitions and the process of enclosing the suspension. Furthermore, it was also difficult to keep different colors of suspensions separate from each other in the partition-type electrophoretic display.

Subsequently, attempts were made to enclose the suspension in microcapsules. U.S. Pat. Nos. 5,961,804 and 5,930,026 describe microencapsulated electrophoretic displays. The reference display has a substantially two dimensional arrangement of microcapsules each having therein an electrophoretic composition of a dielectric fluid and a suspension of charged pigment particles that visually contrast with the dielectric solvent. The microcapsules can be formed by interfacial polymerization, in-situ polymerization or other known methods such as physical processes, in-liquid curing or simple/complex coacervation. The microcapsules, after their formation, may be injected into a cell housing two spaced-apart electrodes, or "printed" into or coated on a transparent conductor film. The microcapsules may also be immobilized within a transparent matrix or binder that is itself sandwiched between the two electrodes.

The electrophoretic displays prepared by these prior art processes, in particular the microencapsulation process as disclosed in U.S. Pat. Nos. 5,930,026, 5,961,804, and 6,017,584, have many shortcomings. For example, the electrophoretic display manufactured by the microencapsulation process suffers from sensitivity to environmental changes (in particular sensitivity to moisture and temperature) due to the wall chemistry of the microcapsules. Secondly the electrophoretic display based on the microcapsules has poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the prior art electrophoretic display of this type has poor resolution and addressability for color applications.

SUMMARY OF THE INVENTION

The first aspect of the present invention is directed to an electrophoretic display comprising cells of well-defined shape, size and aspect ratio. The cells are filled with an electrophoretic fluid comprising charged particles dispersed in a dielectric solvent and are individually sealed with a polymeric sealing layer. The polymeric sealing is preferably formed from a composition comprising a thermoset or thermoplastic precursor. In one embodiment of the invention, the cells are partially filled with electrophoretic fluid above which the sealing layer forms a contiguous film and is in intimate contact with both the fluid and the peripheral of the cell walls that are not covered by the fluid. In one of the preferred embodiments of the invention, the sealing layer further extends over the top surface of the cell side walls.

In another preferred embodiment of the invention, the top surface of the cell walls is at least 0.01 micrometer ($\mu$) above the top surface of electrophoretic fluid. More preferably, the top surface of the cell walls is about 0.02$\mu$ to 15$\mu$ above the top surface of electrophoretic fluid. Most preferably, the top surface of the cell walls is about 0.1$\mu$ to 4$\mu$ above the top surface of electrophoretic fluid.

In another preferred embodiment of the invention, the top surface of the polymeric sealing layer is at least 0.01$\mu$ above the top surface of the cell walls to improve the adhesion between the sealing layer and the cells. More preferably, the top surface of the polymeric sealing layer is about 0.01$\mu$ to 50$\mu$ above the top surface of the cell walls. Even more preferably, the top surface of the polymeric sealing layer is about 0.5$\mu$ to 8$\mu$ above the top surface of the cell walls. The total thickness of the sealing layer is about 0.1$\mu$ to 50$\mu$, preferably about 0.5 to 15$\mu$, more preferably 1$\mu$ to 8$\mu$. Most preferably, the sealing layer forms a contiguous film above the cell walls and the electrophoretic fluid.

Another aspect of the invention relates to a novel process for the manufacture of such an electrophoretic display.

A further aspect of the invention relates to the preparation of cells of well-defined shape, size and aspect ratio. The cells enclose a suspension of charged pigment particles dispersed in a dielectric solvent and are formed from microcups prepared according to the present invention. Briefly, the process for the preparation of the microcups involves embossing a thermoplastic or thermoset precursor layer coated on a conductor film with a pre-patterned male mold, followed by releasing the mold during or after the thermoplastic or thermoset precursor layer is hardened by radiation, cooling, solvent evaporation, or other means. Alternatively, the microcups may be formed from imagewise exposure of the conductor film coated with a radiation curable layer followed by removing the unexposed areas after the exposed areas have become hardened.

Solvent-resistant, thermomechanically stable microcups having a wide range of size, shape, and opening ratio can be prepared by either one of the aforesaid methods. The microcups are then filled with a suspension of charged pigment particles in a dielectric solvent, and sealed.

Yet another aspect of the present invention relates to the sealing of the microcups filled with the electrophoretic fluid containing a dispersion of charged pigment particles in a dielectric fluid. Sealing can be accomplished by a variety of ways. One of the preferred embodiments, is accomplished by dispersing a sealing composition comprising a thermoplastic, thermoset, or their precursors in the electrophoretic fluid before the filling step. The sealing composition is immiscible with the dielectric solvent and has a specific gravity lower than that of the solvent and the pigment particles. After filling, the sealing composition phase separates from the electrophoretic fluid and forms a supernatant layer at the top of the fluid. The sealing of the microcups is then conveniently accomplished by hardening the sealing layer by solvent evaporation, interfacial reaction, moisture, heat, or radiation. UV radiation is the preferred method to harden the sealing layer, although a combination of two or more curing mechanisms as described above may be used to increase the throughput of sealing.

In another preferred embodiment, the sealing can be accomplished by overcoating the electrophoretic fluid with a sealing composition comprising a thermoplastic, thermoset, or their precursors. The sealing is then accomplished by hardening the precursor by solvent evaporation, interfacial reaction, moisture, heat, radiation, or a combination of curing mechanisms. These sealing processes are especially unique features of the present invention. Additives such as surfactants, leveling agents, fillers, binders, viscosity modifiers (thinning agents or thickeners), co-solvents, and antioxidants may be added to the sealing composition to improve the display performance. Dyes or pigments may also be added in the sealing layer particularly if the display is viewed from the opposite side.

Yet another aspect of the present invention relates to a multiple step process for the manufacture of a monochrome electrophoretic display. The processing steps include preparation of the microcups by any one of the methods described above, sealing of the microcups, and finally laminating the sealed array of microcups with a second conductor film with an adhesive. This multiple-step process can be carried out roll to roll continuously.

Yet another aspect of the present invention relates to a process for the manufacture of a full color electrophoretic display by laminating or coating the preformed microcups with a layer of positively working photoresist, selectively opening a certain number of the microcups by imagewise exposing the positive photoresist, followed by developing the resist, filling the opened cups with a colored electrophoretic fluid, and sealing the filled microcups by one of the sealing processes of this invention. These steps may be repeated to create sealed microcups filled with electrophoretic fluids of different colors.

These multiple-step processes as disclosed may be carried out roll-to-roll on a web continuously or semi-continuously. The microcup structure in fact enables a format flexible and efficient roll-to-roll continuous manufacturing. These processes are very cost effective as compared to typical display manufacturing processes.

One advantage of the electrophoretic display (EPD) of this invention is that the microcup wall is in fact a built-in spacer to keep the top and bottom substrates apart at a fixed distance. The mechanical properties and structural integrity of this type of display is significantly better than any prior art displays including those manufactured by using spacer particles. In addition, displays involving microcups have desirable mechanical properties including reliable display performance when the display is bent, rolled, or under compression pressure from, for example, a touch screen application. The use of the microcup technology also eliminates the need of an edge seal adhesive to predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut into almost any dimensions without the risk of damaging the display performance due to the loss of display fluid in the active areas. In other words, the microcup structure enables a format flexible display manufacturing process, wherein the process produces a continuous output of displays in a large sheet format which can be cut into any desired sizes.

The isolated microcup or cell structure is particularly important when cells are filled with fluids of different specific properties such as colors and switching rates. Without the microcup structure, it will be very difficult to prevent the fluids in adjacent areas from intermixing or being subject to cross-talk during operation. As a result, the bistable reflective display of this invention also has excellent color addressability and switching performances.

The electrophoretic display prepared according to the present invention is not sensitive to environment, particularly humidity and temperature. The display is thin, flexible, durable, easy-to-handle, and format-flexible. The drawbacks of electrophoretic displays prepared by the prior art processes are therefore all eliminated.

BRIEF DESCRIPTION OF THE DRAWINGS

FIGS. 4a–4c show a typical microcup array prepared by microembossing.

FIGS. 5a–5c show alternative processing steps for preparing the microcups involving imagewise exposure of the conductor film coated with a thermoset precursor to UV radiation.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "cell", in the context of the present invention, is intended to mean the single unit formed from a sealed microcup. The cells are filled with charged pigment particles dispersed in a solvent or solvent mixture.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of electrophoretic displays. In this application, it refers to the depth to width or depth to length ratio of the microcups.

Preferred Embodiments

Figure 1:
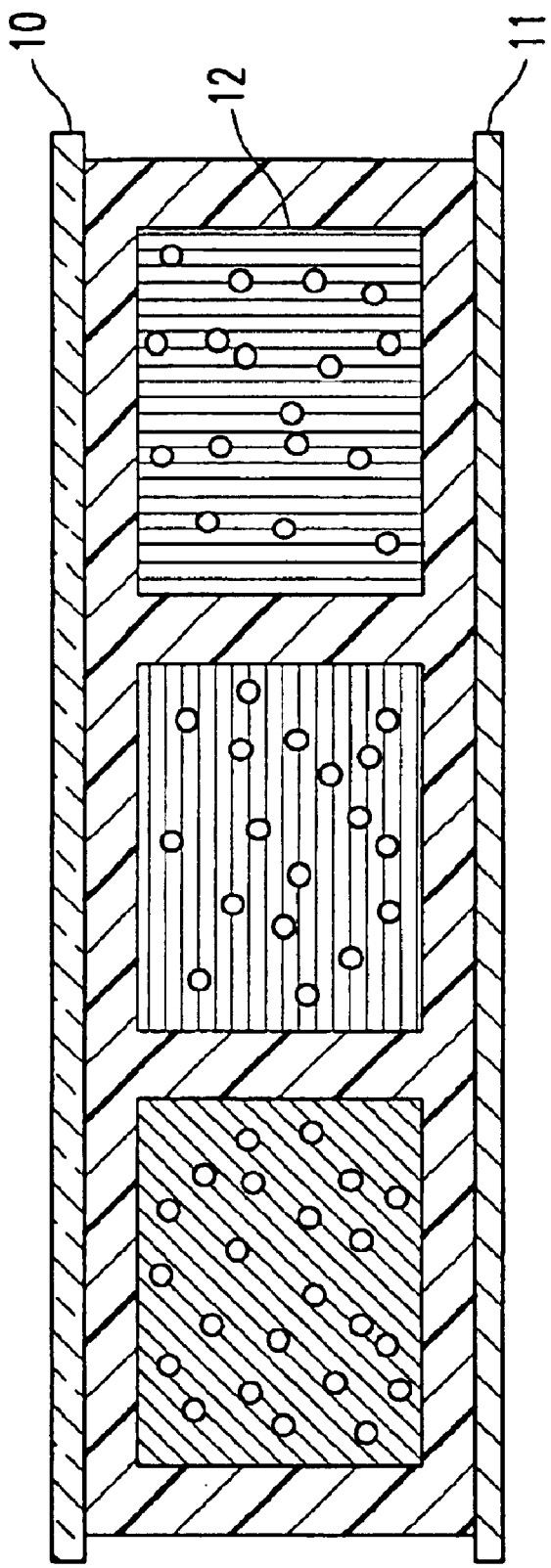
FIG. 1 is a schematic depiction of the electrophoretic display of the present invention.

An electrophoretic display of the present invention, as shown in FIG. 1, comprises two electrode plates (10, 11), at least one of which is transparent (10), and a layer of well-defined cells (12) enclosed between the two electrodes. The cells are filled with charged pigment particles dispersed in a colored dielectric solvent, and individually sealed with a polymeric sealing layer (not shown). When a voltage difference is imposed between the two electrodes, the charged particles migrate to one side, such that either the color of the pigment or the color of the solvent is seen through the transparent conductor film. At least one of the two conductors is patterned. The process for the preparation of such an electrophoretic display involves several aspects.

I. Preparation of the Microcups

I(a) Preparation of the Microcups by Embossing

Figure 2A:
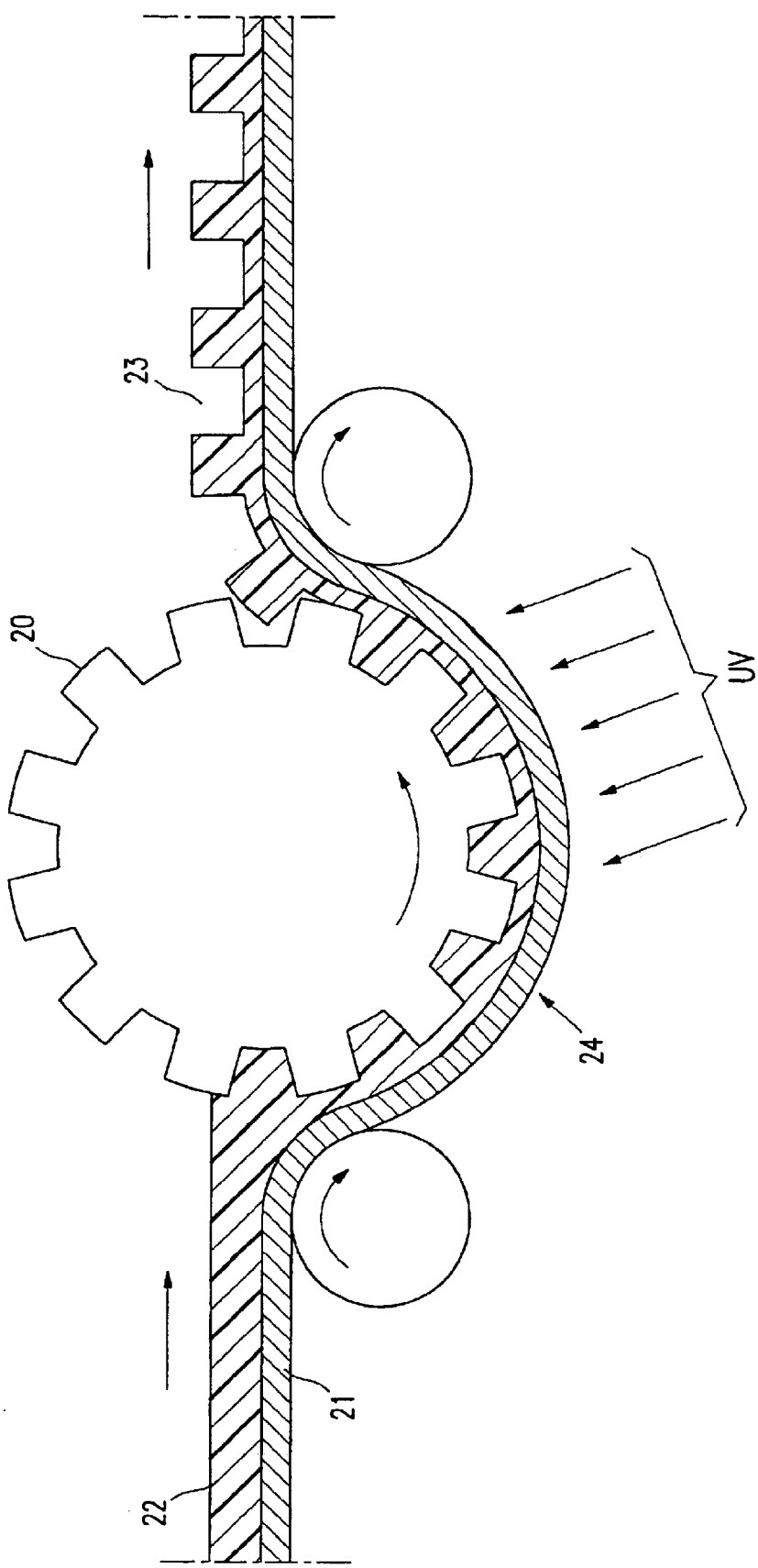
FIGS. 2a and 2b show the roll-to-roll process for the manufacture of an electrophoretic display, in particular, the creation of microcups by embossing a conductor film coated with a UV curable composition.
Figure 2B:
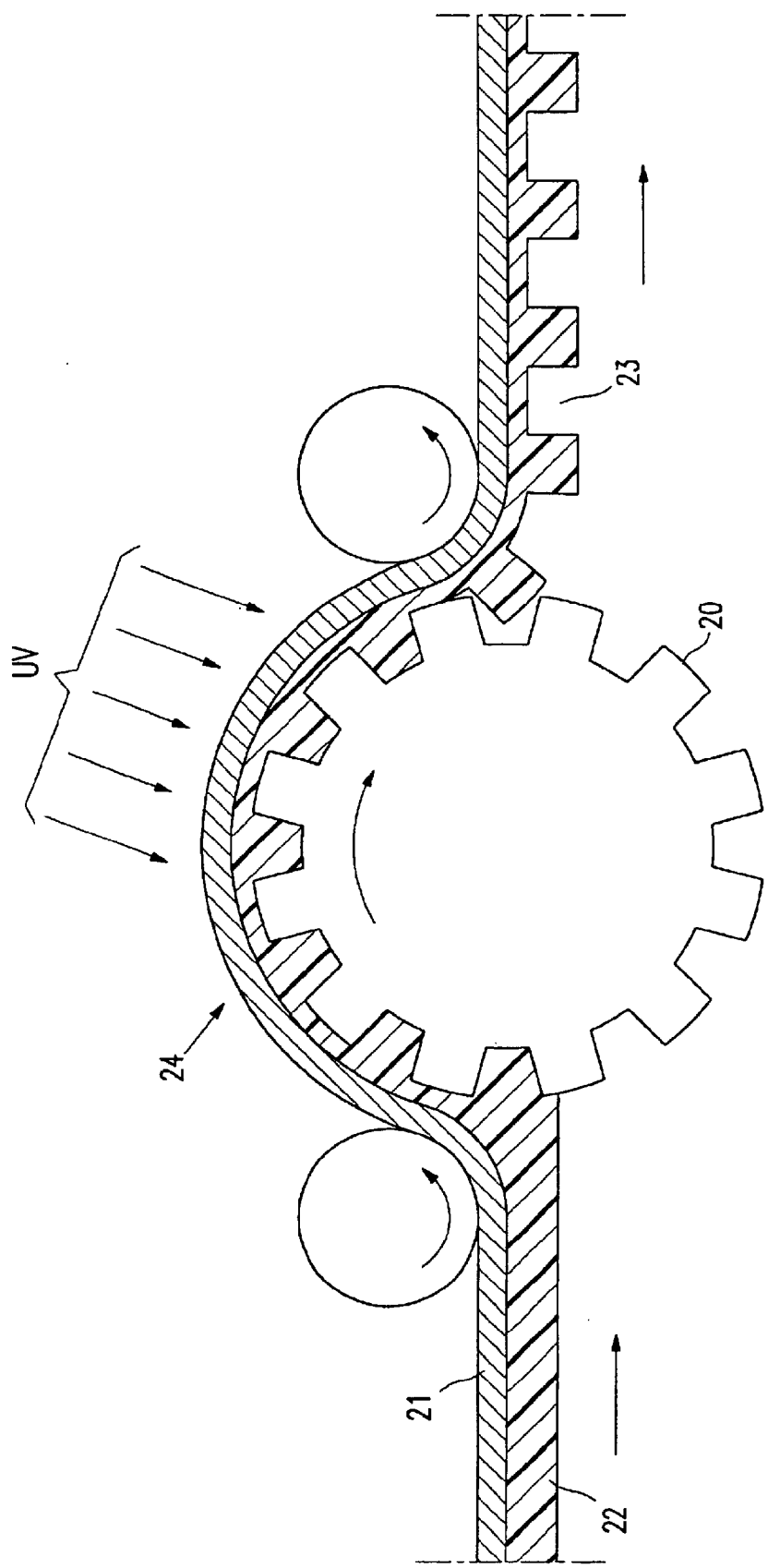

This processing step is shown in FIGS. 2a and 2b. The male mold (20) may be placed either above (FIG. 2a) or below (FIG. 2b) the web (24). The transparent conductive substrate is constructed by forming a transparent conductor film (21) on a glass plate or a plastic substrate. A composition comprising a thermoplastic, thermoset, or their precursors (22) is then coated on the conductor film. The thermoplastic or thermoset precursor layer is embossed at a temperature higher than the glass transition temperature of the thermoplastics or thermoset precursor layer by the male mold in the form of a roller, plate or belt.

The thermoplastic or thermoset precursor for the preparation of the microcups may be multifunctional acrylate or methacrylate, vinylether, epoxide and their oligomers, polymers and the like. Multifunctional acrylate and their oligomers are the most preferred. A combination of multifunctional epoxide and multifunctional acrylate is also very useful to achieve desirable physico-mechanical properties. A crosslinkable oligomer imparting flexibility, such as urethane acrylate or polyester acrylate, is usually also added to improve the flexure resistance of the embossed micro-cups. The composition may contain polymer, oligomer, monomer and additives or only oligomer, monomer and additives. The glass transition temperatures (or Tg) for this class of materials usually range from about $-70°$ C. to about $150°$ C., preferably from about $-20°$ C. to about $50°$ C. The microembossing process is typically carried out at a temperature higher than the Tg. A heated male mold or a heated housing substrate against which the mold presses may be used to control the microembossing temperature and pressure.

As shown in FIGS. 2a and 2b, the mold is released during or after the precursor layer is hardened to reveal an array of microcups (23). The hardening of the precursor layer may be accomplished by cooling, solvent evaporation, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer.

Preparation of the Male Mold

Figure 3A:
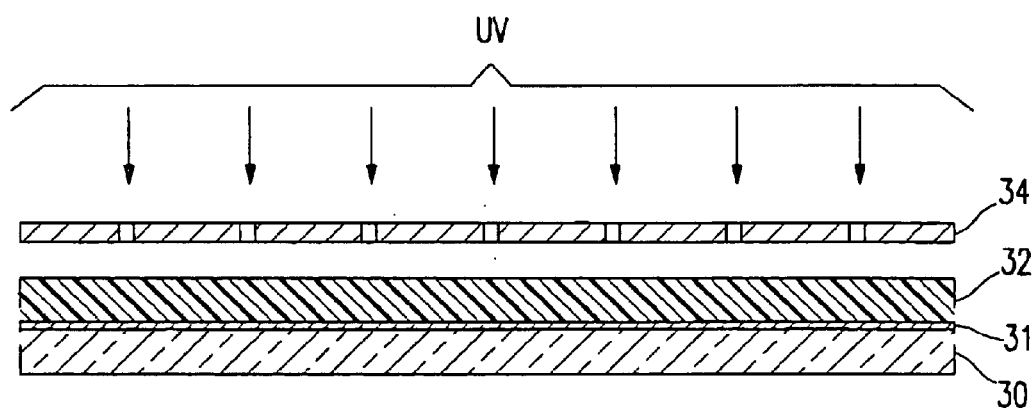
FIGS. 3a–3d illustrate a typical method of preparing the male mold for microembossing.
Figure 3B:
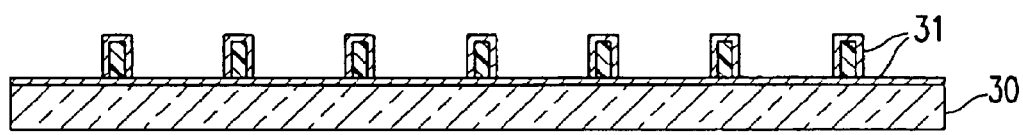
Figure 3C:
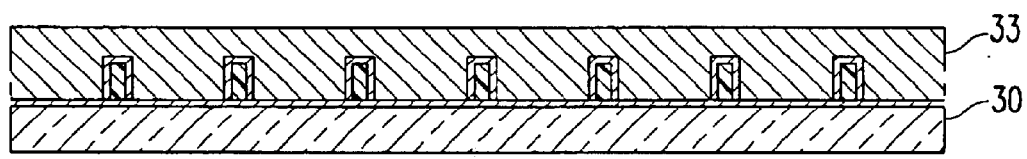
Figure 3D:

The male mold may be prepared by a photoresist process followed by either etching or electroplating. A representative example for the preparation of the male mold is given in FIG. 3. With electroplating (FIG. 3a), a glass base (30) is sputtered with a thin layer (typically 3000 Å) of a seed metal (31) such as chrome inconel. It is then coated with a layer of photoresist (32) and exposed to UV. A mask (34) is placed between the UV and the layer of photoresist (32). The exposed areas of the photoresist become hardened. The unexposed areas are then removed by washing them with an appropriate solvent. The remaining hardened photoresist is dried and sputtered again with a thin layer of seed metal. The master (FIG. 3b) is then ready for electroforming. A typical material used for electroforming is nickel cobalt (33). Alternatively, the master can be made of nickel by nickel sulfamate electroforming or electroless nickel deposition as described in "Continuous manufacturing of thin cover sheet optical media", SPIE Proc. Vol. 1663, pp.324 (1992). The floor of the mold (FIG. 3d) is typically between 50 to 400 microns thick. The master can also be made using other microengineering techniques including e-beam writing, dry etching, chemical etching, laser writing or laser interference as described in "Replication techniques for micro-optics", SPIE Proc. Vol. 3099, pp 76–82 (1997). Alternatively, the mold can be made by photomachining using plastics, ceramics or metals.

FIG. 4a is an optical profilometry three-dimensional profile of the typical microcups prepared by microembossing. FIG. 4b is an optical microscopic picture showing the openings of the microcups from the top view. FIG. 4c is the optical profilometry vertical cross-section view of a row of microcups showing their depth.

I(b) Preparation of the Microcups by Imagewise Exposure

Alternatively, the microcups may be prepared by image-wise exposure (FIG. 5a) of a radiation curable material (51) coated on the conductor film (52) to UV or other forms of radiation through a mask (50). The conductor film (52) is on a plastic substrate (53).

For a roll-to-roll process, the photomask may be synchronized with the web and move at the same speed as the latter. In the photomask (50) in FIG. 5a, the dark squares (54) represent the opaque area and the space (55) between the dark squares represents the opening area. The UV radiates through the opening area (55) onto the radiation curable material. The exposed areas become hardened and the unexposed areas (protected by the opaque area in the mask) are then removed by an appropriate solvent or developer to form the microcups (56). The solvent or developer is selected from those commonly used for dissolving or reducing the viscosity of radiation curable materials such as methylethylketone, toluene, acetone, isopropanol or the like.

FIGS. 5b and 5c illustrate two other options for the preparation of microcups by imagewise exposure. The features in these two figures are essentially the same as shown in FIG. 5a and the corresponding parts are also numbered the same. In FIG. 5b, the conductor film (52) used is opaque and pre-patterned. In this case, it may be advantageous to imagewise expose the radiation sensitive material through the conductor pattern which serves as the photomask. The microcups (56) can then be formed by removing the unexposed areas after UV radiation. In FIG. 5c, the conductor film (52) is also opaque and line-patterned. The radiation curable material is exposed from the bottom through the conductor line pattern (52) which serves as the first photomask. A second exposure is performed from the other side through the second photomask (50) having a line pattern perpendicular to the conductor lines. The unexposed area is then removed by a solvent or developer to reveal the microcups (56).

In general, the microcups can be of any shape, and their sizes and shapes may vary. The microcups may be of substantially uniform size and shape in one system. However, in order to maximize the optical effect, microcups having a mixture of different shapes and sizes may be produced. For example, microcups filled with a dispersion of the red color may have a different shape or size from the green microcups or the blue microcups. Furthermore, a pixel may consist of different numbers of microcups of different colors. For example, a pixel may consist of a number of small green microcups, a number of large red microcups, and a number of small blue microcups. It is not necessary to have the same shape and number for the three colors.

The openings of the microcups may be round, square, rectangular, hexagonal, or any other shape. The partition area between the openings is preferably kept small in order to achieve a high color saturation and contrast while maintaining desirable mechanical properties. Consequently the honeycomb-shaped opening is preferred over, for example, the circular opening.

For reflective electrophoretic displays, the dimension of each individual microcup may be in the range of about $10^2$ to about $5 \times 10^5$ $\mu m^2$, preferably from about $10^3$ to about $5 \times 10^4$ $\mu m^2$. The depth of the microcups is in the range of about 3 to about 100 microns, preferably from about 10 to about 50 microns. The ratio between the area of opening to the area of cell walls is in the range of from about 0.05 to about 100, preferably from about 0.4 to about 20. The width of the openings usually are in the range of from about 15 to about 450 microns, preferably from about 25 to about 300 microns from edge to edge of the openings.

II. Preparation of the Suspension/Dispersion

The microcups are filled with charged pigment particles dispersed in a dielectric solvent. The dispersion may be prepared according to methods well known in the art such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices*, ED-24, 827 (1977), and *J. Appl. Phys.* 49(9), 4820 (1978). The charged pigment particles visually contrast with the medium in which the particles are suspended. The medium is a dielectric solvent which preferably has a low viscosity and a dielectric constant in the range of about 1 to about 30, preferably about 1.5 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluoro solvents such as FC-43™, FC-70™ and FC-5060™ from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden™ from Ausimont or Krytox™ Oils and Greases K-Fluid Series from DuPont, Del. In one preferred embodiment, poly (chlorotrifluoroethylene) is used as the dielectric solvent. In another preferred embodiment, poly(perfluoropropylene oxide) is used as the dielectric solvent.

In addition to the charged primary pigment particles such as $TiO_2$ particles, the electrophoretic fluid may be colored by a contrasting colorant. The contrast colorant may be formed from dyes or pigments. Nonionic azo, anthraquinone and phthalocyanine dyes or pigments are particularly useful. Other examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthraquinone blue, anthraquinone yellow 114, anthraquinone reds 111 and 135 and anthraquinone green 28 from Aldrich. In case of an insoluble pigment, the pigment particles for generating the color of the medium may also be dispersed in the dielectric medium. These color particles are preferably uncharged. If the pigment particles for generating color in the medium are charged, they preferably carry a charge which is opposite from that of the charged pigment particles. If both types of pigment particles carry the same charge, then they should have different charge density or different electrophoretic mobility. In any case, the dye or pigment for generating color of the medium must be chemically stable and compatible with other components in the suspension.

The charged pigment particles may be organic or inorganic pigments, such as $TiO_2$, phthalocyanine blue, phthalocyanine green, diarylide yellow, diarylide AAOT Yellow, and quinacridone, azo, rhodamine, perylene pigment series from Sun Chemical, Hansa yellow G particles from Kanto Chemical, and Carbon Lampblack from Fisher. Submicron particle size is preferred. The particles should have acceptable optical characteristics, should not be swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex™ from International Specialty Products), (meth)acrylic acid copolymers, and N,N-dimethylaminoethyl (meth)acrylate copolymers. Fluorosurfactants are particularly useful as charge controlling agents in fluorocarbon solvents. These include FC fluorosurfactants such as FC-170C™, FC-171™, FC-176™, FC430™, FC431™ and FC-740™ from 3M Company and Zonyl™ fluorosurfactants such as Zonyl™ FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For a black/white electrophoretic display, the suspension comprises charged white particles of titanium oxide ($TiO_2$) dispersed in a black solvent or charged black particles dispersed in a dielectric solvent. A black dye or dye mixture such as Pylam Spirit Black and Fast Spirit Black from Pylam Products Co. Arizona, Sudan Black B from Aldrich, Thermoplastic Black X-70™ from BASF, or an insoluble black pigment such as carbon black may be used to generate the black color of the solvent. For other colored suspensions, there are many possibilities. For a subtractive color system, the charged $TiO_2$ particles may be suspended in a dielectric solvent of cyan, yellow or magenta color. The cyan, yellow or magenta color may be generated via the use of a dye or a pigment. For an additive color system, the charged $TiO_2$ particles may be suspended in a dielectric solvent of red, green or blue color generated also via the use of a dye or a pigment. The red, green, blue color system is preferred for most applications.

III. Sealing of the Microcups

The sealing of the microcups may be accomplished in a number of ways. A preferred approach is to disperse into an electrophoretic fluid a sealing composition comprising a material selected from the group consisting of polyvalent acrylate or methacrylate, cyanoacrylates, polyvalent vinyl including vinylbenzene, vinylsilane, vinylether, polyvalent epoxide, polyvalent isocyanate, polyvalent allyl, oligomers or polymers containing crosslinkable functional groups and the like, and optionally additives such as a polymeric binder or thickener, photoinitiator, catalyst, filler, colorant, and surfactant. The sealing composition and the electrophoretic fluid containing charged pigment particles dispersed in a colored dielectric solvent are thoroughly blended by, for example, an in-line mixer and immediately coated onto the microcups with a precision coating mechanism such as Myrad bar, gravure, doctor blade, slot coating or slit coating. Excess fluid is scraped away by a wiper blade or a similar device. A small amount of a weak solvent or solvent mixture such as isopropanol, methanol, or their aqueous solutions may be used to clean the residual electrophoretic fluid on the top surface of the partition walls of the microcups. The sealing composition is immiscible with the dielectric solvent and has a specific gravity lower than that of the dielectric solvent and the pigment particles. Volatile organic solvents may be used to control the viscosity and coverage of the electrophoretic fluid. The thus-filled microcups are then dried and the sealing composition floats to the top of the electrophoretic fluid. The microcups may be sealed by hardening the supernatant sealing layer by for example, UV, during its separation or after it floats to the top. Other forms of radiation such as visible light, IR and electron beam may be used to cure and seal the microcups. Alternatively, heat or moisture may also be employed to dry, harden and seal the microcups, if heat or moisture curable compositions were used.

A preferred group of dielectric solvents exhibiting desirable density and solubility discrimination against acrylate monomers and oligomers are halogenated hydrocarbons particularly fluorinated and perfluorinated solvents and their derivatives. Surfactants may be used to improve the adhesion and wetting at the interface between the electrophoretic fluid and the sealing materials. Useful surfactants include the FC™ surfactants from 3M Company, Zonyl™ fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the sealing composition may be coated sequentially into the microcups, if the sealing precursor is at least partially compatible with the dielectric solvent. Thus, the sealing of the microcups may be accomplished by overcoating a thin layer of a sealing composition comprising a material selected from the group consisting of polyvalent acrylate or methacrylate, cyanoacrylates, polyvalent vinyl including vinylbenzene, vinylsilane, vinylether, polyvalent epoxide, polyvalent isocyanate, polyvalent allyl, oligomers or polymers containing crosslinkable functional groups and the like. The material may be curable by radiation, heat, moisture or interfacial reactions and curing on the surface of the filled microcups. Interfacial polymerization followed by UV curing is very beneficial to the sealing process. Intermixing between the electrophoretic layer and the overcoat is significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is significantly lower than that of the electrophoretic fluid. Volatile organic solvents may be used to adjust the viscosity and the thickness of the coatings. When a volatile solvent is used in the overcoat, it is preferred that it is immiscible with the dielectric solvent. The two-step overcoating process is particularly useful when the colorant used in the electrophoretic fluid is at least partially compatible with the sealing composition. Additives or fillers such as surfactants, antioxidants, crosslinkers, thickeners, and polymer binders may also be used to improve the performance or processability. Pigments, dyes, or fillers such as silica, $CaCO_3$, $BaSO_4$, $TiO_2$, metal particles and their oxides, carbon black, may also be used particularly when the display is viewed from the opposite side.

Figure 8:
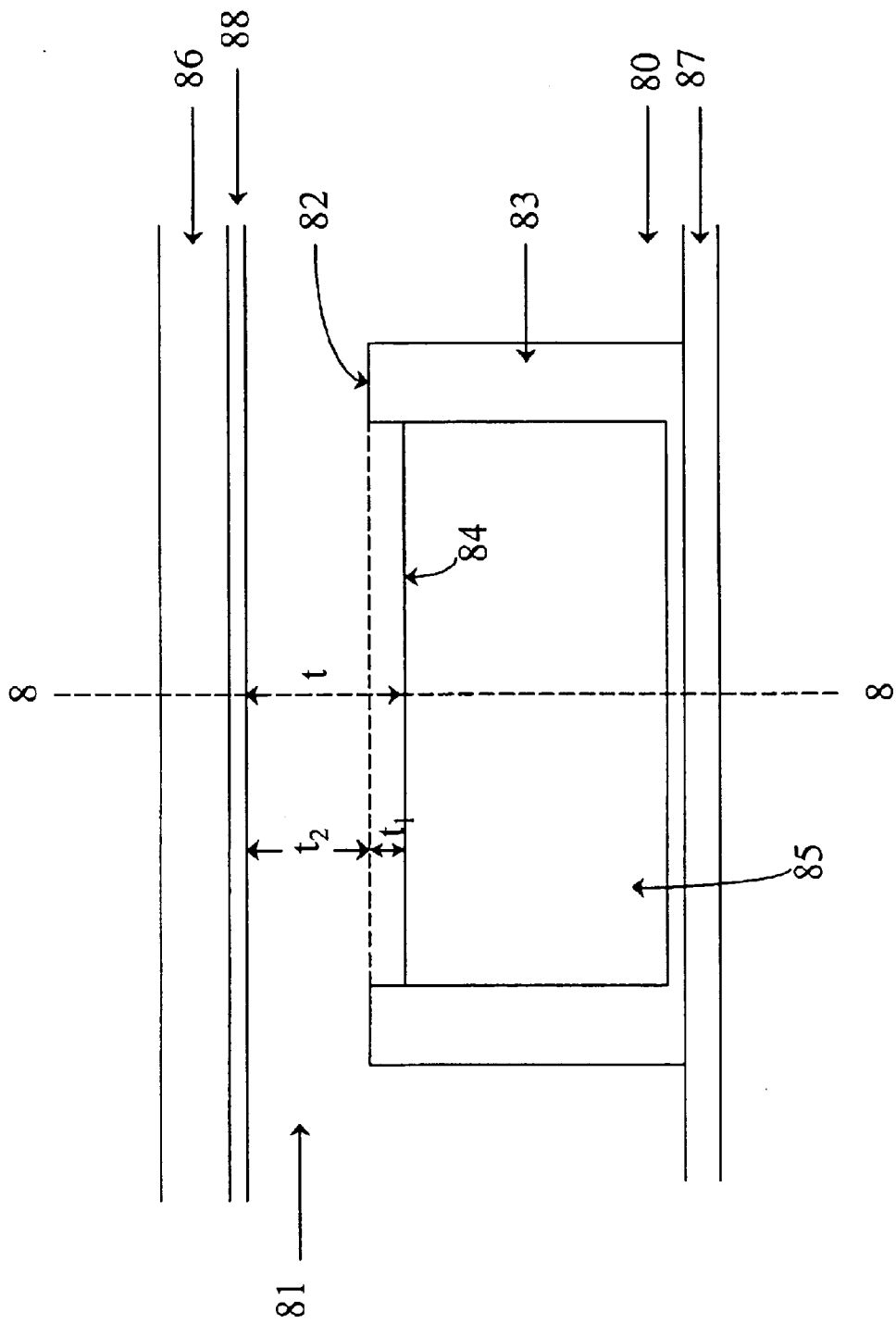
FIG. 8 depicts an electrophoretic display cell partially filled with an electrophoretic fluid and the sealing layer forms a contiguous film on the fluid and extends over the top surface of the cell side walls.

The sealing layer may extend over the top surface of the cell side walls as shown in FIG. 8. The stopper-shaped sealing layer (81) has a thickness (t, measured at line 8—8 of the cell 80) ranging from about $0.1\mu$ to about $50\mu$, preferably from $0.5\mu$ to $15\mu$, more preferably $1\mu$ to $8\mu$. The cell (80) is partially filled with the electrophoretic fluid (85). The thickness ($t_1$) of the sealing layer below the top surface (82) of the partition walls (83) and above the interface (84) is at least $0.01\mu$, preferably about $0.02\mu$ to about $15\mu$, more preferably about $0.1\mu$ to about $4\mu$ above the interface. The thickness ($t_2$) of the sealing layer that extends over the top surface (82) of partition wall is at least $0.01\mu$, preferably about $0.01\mu$ to $50\mu$, more preferably about $0.5\mu$ to about $8\mu$.

It is preferred that the sealing layer forms a contiguous film above the cell walls and the electrophoretic fluid.

The cell is sandwiched between two conductive layers (86 and 87). There may be an additional adhesive layer (88) between the top of the sealing layer (81) and the top conductive layer (86). The application of the top conductive layer and the adhesive layer to the cell is illustrated in the following sections.

IV. Preparation of Monochrome Electrophoretic Displays

Figure 6:
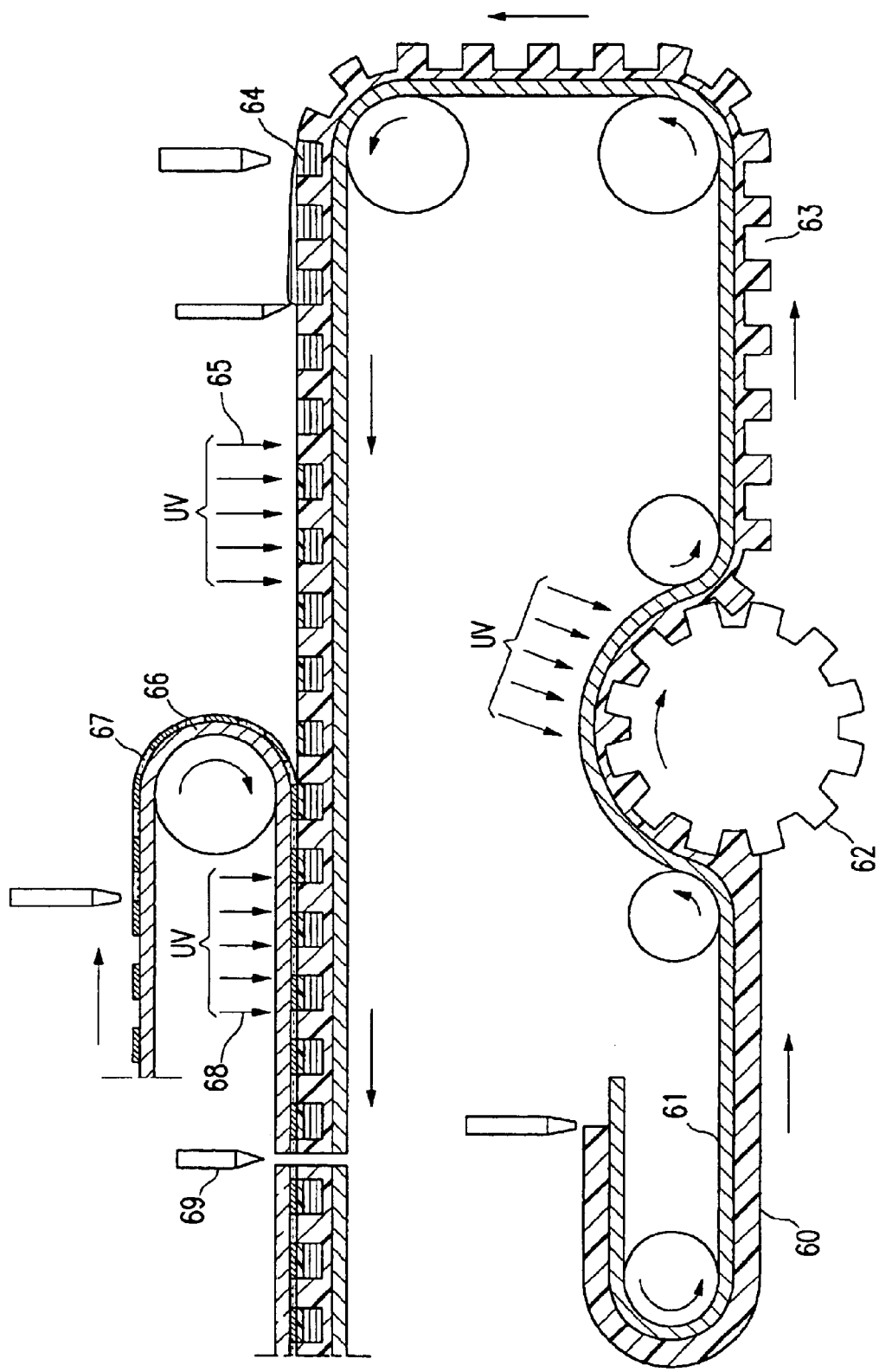
FIG. 6 is a flow chart for manufacturing a black/white electrophoretic display or other single color electrophoretic displays.
Figure 7A:
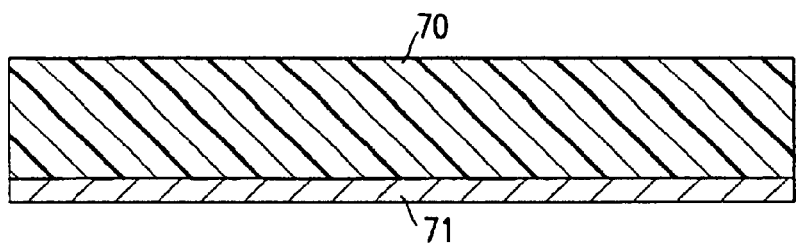
FIGS. 7a–7h are a flow chart for manufacturing a multi-color electrophoretic display.
Figure 7B:
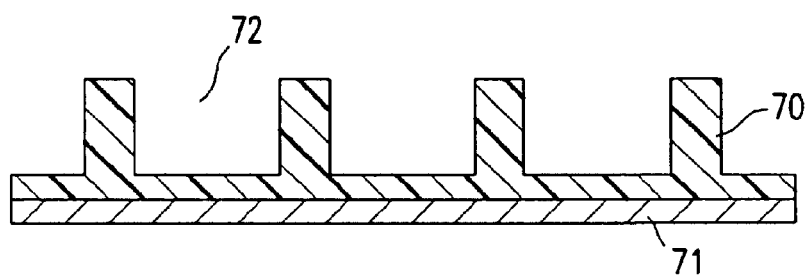
Figure 7C:
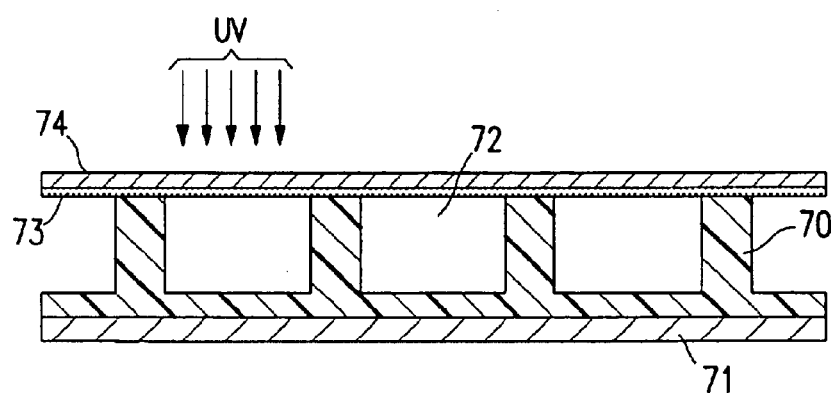
Figure 7D:
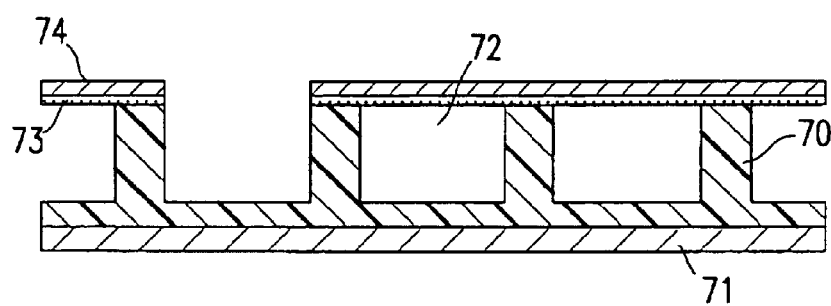
Figure 7E:
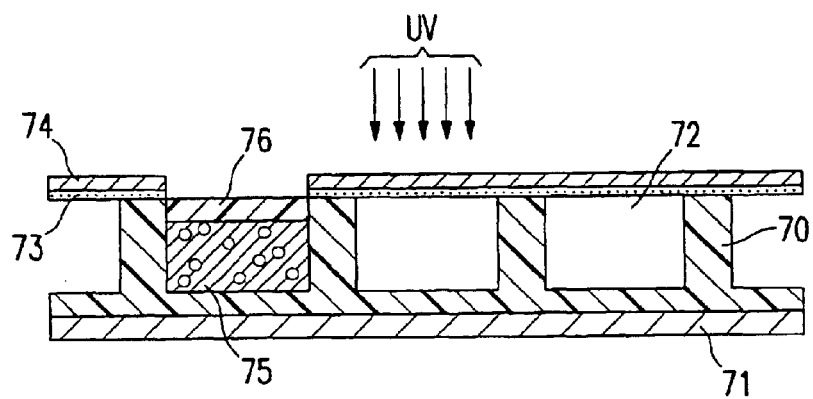
Figure 7F:
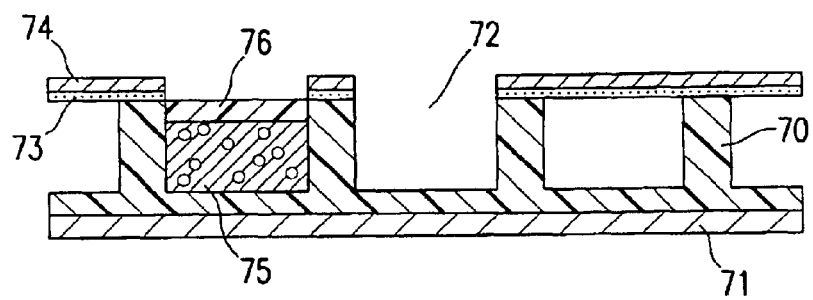
Figure 7G:
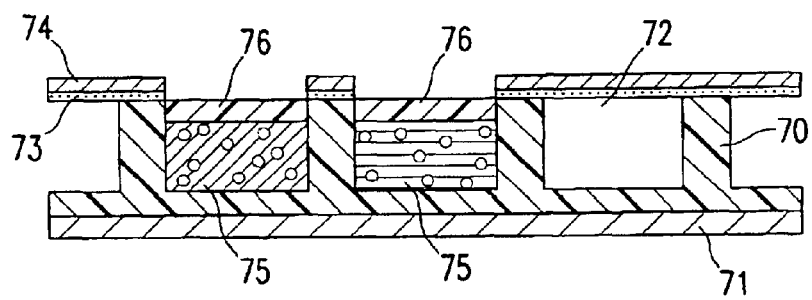
Figure 7H:
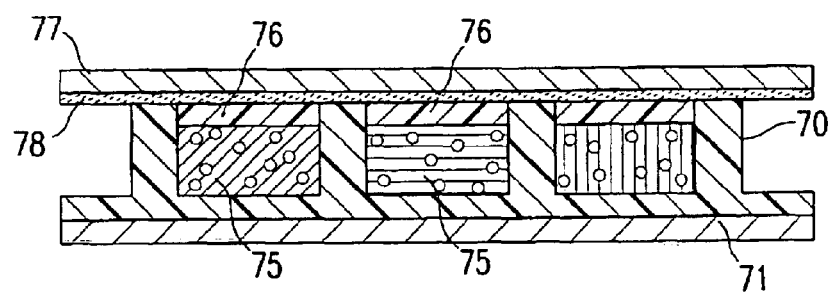

The process is illustrated by the flow diagram as shown in FIG. 6. All microcups are filled with a suspension of the same color composition. The process can be a continuous roll-to-roll process comprising the following steps:

1. Coat a layer of thermoplastic, thermoset, or their precursors (60) optionally with a solvent on a conductor film (61). The solvent, if present, readily evaporates.
2. Emboss the layer (60) at a temperature higher than the glass transition temperature of the layer by a pre-patterned male mold (62).
3. Release the mold from the layer (60) preferably during or after it is hardened by proper means.
4. Fill in the thus-formed array of microcups (63) with a charged pigment dispersion (64) in a colored dielectric solvent containing a sealing composition which is incompatible with the solvent and has a lower specific gravity than the solvent and the pigment particles.
5. Seal the microcups by hardening the sealing composition preferably by radiation such as UV (65), or by heat or moisture during or after the sealing composition separates and forms a supernatant layer on top of the liquid phase, thus form closed electrophoretic cells containing pigment dispersion in a colored dielectric solvent.
6. Laminate the sealed array of electrophoretic cells with a second conductor film (66) pre-coated with an adhesive layer (67) which may be a pressure sensitive adhesive, a hot melt adhesive, a heat, moisture, or radiation curable adhesive. Preferred materials for the adhesive include acrylics, styrene-butadiene copolymers, styrene-butadiene-styrene block coplymers, styrene-isoprene-styrene block copolymers, polyvinylbutyal, cellulose acetate butyrate, polyvinylpyrrolidone, polyurethanes, polyamides, ethylene-vinylacetate copolymers, epoxides, multi-functional acrylates, vinyls, vinylethers, and their oligomers, polymers, and copolymers.

The laminated adhesive may be post cured by radiation such as UV (68) through the top conductor film if the latter is transparent to the radiation. The finished product may be cut (69) after the lamination step.

The preparation of the microcups described above can be conveniently replaced by the alternative procedure of imagewise exposing the conductor film coated with a radiation curable composition followed by removing the unexposed areas by an appropriate solvent.

In one of the preferred embodiment of the invention, the sealing of the microcups may alternatively be accomplished by first partially filling the microcup array with the electrophoretic fluid and then directly overcoating and hardening the sealing composition over the surface of the fluid. This two-step overcoating sealing process is particularly useful when the colorant of the electrophoretic fluid is at least partially compatible with the sealing composition.

V. Preparation of Multi-Color Electrophoretic Displays

For the manufacture of a multi-color electrophoretic display, additional steps are needed to generate microcups containing suspensions of different colors. These additional steps include (1) laminating the already formed microcups with a positively working dry-film photoresist consisting of at least a removable support such as PET-4851™ from Saint-Gobain, Worcester, Mass., a novolac positive photoresist such as Microposit S1818™ from Shipley, and an alkali-developable adhesive layer such as a mixture of Nacor 72-8685™ from National Starch and Carboset 515™ from BF Goodrich; (2) selectively opening a certain amount of the microcups by imagewise exposing the photoresist, removing the removable support film, and developing the positive photoresist with a developer such as diluted Microposit 351™ developer from Shipley; (3) filling the opened cups with the electrophoretic fluid containing charged white pigment ($TiO_2$) particles and dye or pigment of the first primary color; and (4) sealing the filled microcups as described in the preparation of monochrome displays. These additional steps may be repeated to create microcups filled with electrophoretic fluid of the second and the third primary colors. Alternatively, the positively working resist may be applied to the unfilled microcup array by a conventional wet coating process.

More specifically, a multi-color electrophoretic displays may be prepared according to the steps as shown in FIG. 7:

1. Coat a layer of thermoplastic, thermoset, or their precursors (70) on a conductor film (71).
2. Emboss the layer (70) at a temperature higher than its glass transition temperature by a pre-patterned male mold (not shown).
3. Release the mold from the layer (70) preferably during or after it is hardened by solvent evaporation, cooling or crosslinking by radiation, heat or moisture.
4. Laminate the thus formed array of microcups (72) with a dry film positive photoresist which comprises at least an adhesive layer (73), a positive photoresist (74) and a removable plastic cover sheet (not shown).
5. Imagewise expose (FIG. 7*c*) the positive photoresist by UV, visible light, or other radiation, remove the cover sheet, develop and open cups in the exposed area. The purpose of Steps 4 and 5 is to selectively open the microcups in a predetermined area (FIG. 7*d*).
6. Fill in the opened microcups with a charged white pigment dispersion (75) in a dielectric solvent containing at least a dye or pigment of the first primary color and a sealing composition (76) which is incompatible with the electrophoretic fluid and has a lower specific gravity than the solvent or the pigment particles.
7. Seal the microcups to form closed electrophoretic cells containing electrophoretic fluid of the first primary color by hardening the sealing composition (preferably by radiation such as UV, less preferably by heat or moisture) during or after the sealing composition separates and forms a supernatant layer on top of the electrophoretic fluid (FIG. 7*e*).
8. Steps 5–7 described above may be repeated to generate well-defined cells containing electrophoretic fluids of different colors in different areas (FIGS. 7*e*, 7*f* and 7*g*).
9. Laminate the sealed array of electrophoretic cells in registration to a second, pre-patterned transparent conductor film (77) pre-coated with an adhesive layer (78) which may be a pressure sensitive adhesive, a hot melt adhesive, a heat, moisture, or radiation curable adhesive. Preferred materials for the adhesive include acrylics, styrene-butadiene copolymers, styrene-butadiene-styrene block coplymers, styrene-isoprenestyrene block copolymers, polyvinylbutyal, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers, and copolymers.

10. Harden the adhesive.

The preparation of the microcups described in the process above can conveniently be replaced by the alternative procedure of imagewise exposing the conductor film coated with a radiation curable composition followed by removing the unexposed areas by an appropriate solvent. The sealing of the microcups may be alternatively accomplished by directly coating a layer of the sealing composition over the surface of the liquid phase. The positively working photoresist in Step 4 may alternatively be applied onto the unfilled microcup array by a conventional wet coating process.

The thickness of the display produced by the present processes as described can be as thin as a piece of paper. The width of the display is the width of the coating web (typically 3–90 inches). The length of the display can be anywhere from inches to thousands of feet depending on the size of the roll.

EXAMPLES

The following examples are given to enable those skilled in the art to more clearly understand and to practice the present invention. They should not be considered as limiting the scope of the invention, but merely as being illustrative and representative thereof.

EXAMPLE 1

Preparation of Microcups by Microembossing

The composition shown in Table 1 was coated onto Mylar™ J101/200 gauge using a Nickel Chrome bird type film applicator with an opening of 3 mil. The solvent was allowed to evaporate leaving behind a tacky film with a Tg below room temperature.

TABLE 1

PMMA-containing composition for microembossing

| No. | Description | Ingredient | Supplier | Wt % |
|---|---|---|---|---|
| 1 | Epoxy acrylate | Ebecryl ™ 3605 | UCB Chemicals | 7.35 |
| 2 | Monomer | Sartomer ™ SR205 | Sartomer | 9.59 |
| 3 | Urethane acrylate | Ebecryl ™ 6700 | UCB Chemicals | 4.87 |
| 4 | Polymethyl-methacrylate | Elvacite ™ 2051 | ICI | 9.11 |
| 5 | Photoinitiator | Darocur ™ 1173 | Ciba | 1.45 |
| 6 | Cationic photoinitiator | Cyracure ™ UVI 6976 | Union Carbide | 0.60 |
| 7 | Solvent | Acetone | Aldrich | 67.03 |
|   | Total |   |   | 100.00 |

A pre-patterned stencil from Photo Stencil, Colorado Springs, Colo., was used as the male mold for microembossing and Frekote™ 700-NC from Henkel was used as the mold release. The coated film was then embossed by the stencil using a pressure roller at room temperature. The coating was then UV cured for about 20 minutes through the Mylar™ film using a Loctite Zeta 7410™ exposure unit equipped with a metal fluoride lamp with an intensity of 80 mW/cm$^2$ at 365 nm. The embossed film was then released from the mold to reveal well-defined microcups having lateral dimensions ranging from 60 μm to 120 μm (200–400 dpi) and a depth ranging from 5 μm to 30 μm as measured by optical profilometry and microscope (FIGS. 4a–4c).

EXAMPLE 2

Preparation of Microcups

A composition containing solid oligomer, monomer and additive is shown in Table 2. The glass transition temperature of the mixture is again below room temperature. The tacky coating was deposited on top of Mylar™ J101/200 gauge as before. Embossing was conducted at 60° C. using a heated pressure roller or laminator. Well-defined high resolution microcups (100–400 dpi) with depth ranging from 5–30 microns were produced.

TABLE 2

Embossing composition containing oligomer, monomer, additive and solvent

| No. | Description | Ingredient | Supplier | Wt % |
|---|---|---|---|---|
| 1 | Epoxy acrylate | Ebecryl ™ 3903 | UCB Chemicals | 17.21 |
| 2 | Monomer | HDODA | UCB Chemicals | 8.61 |
| 3 | Urethane acrylate | Ebecryl ™ 4827 | UCB Chemicals | 2.87 |
| 4 | Photoinitiator | Irgacure ™ 500 | Ciba | 1.43 |
| 5 | Slip | Ebecryl ™ 1360 | UCB Chemicals | 1.60 |
| 6 | Solvent | Acetone | Aldrich | 68.26 |
|   | Total |   |   | 100 |

EXAMPLE 3

Preparation of Pigment Dispersion in Dielectric Solvent

Polystyrene (0.89 grams, Polysciences, Inc., mw. 50,000) and AOT (0.094 grams, American Cyanamide, sodium dioctylsulfosuccinate) were dissolved in 17.77 grams of hot xylene (Aldrich). Ti-Pure R-706™ (6.25 grams) was added to the solution and ground in an attritor at 200 rpm for more than 12 hours. A low viscosity, stable dispersion was obtained. Oil-blue N (0.25 grams, Aldrich) was added to color the dispersion. The suspension was then tested in a standard electrophoretic cell comprising two ITO conductor plates separated by a 24 microns spacer. High contrast, alternating white and blue images were observed with a switching rate of about 60 Hz and a rising time of 8.5 msec at 80 volts.

EXAMPLE 4

Preparation of Pigment Dispersion

The experiment of Example 3 was repeated, except Oil Red EGN (Aldrich) and an electrophoretic cell with a 24 microns spacer were used. High contrast, alternating red and white images were observed with a switching rate of 60 Hz and a rising time of 12 msec at 60 volts.

EXAMPLE 5

Preparation of Pigment Dispersion

Ti-Pure R-706™ (112 grams) was ground by an attritor in a solution containing 11.2 grams of a maleic anhydride copolymer (Baker Hughes X-5231™), 24 grams of 3,4-dichlorobenzotrifluoride, and 24 grams of 1,6-dichlorohexane (both from Aldrich). Similarly, 12 grams of carbon black were ground in a solution containing 1.2 grams of alkylated polyvinylpyrrolidone (Ganex™ V216 from ISP), 34 grams of 3,4-dichlorobenzotrifluoride, and 34 grams of 1,6-dichlorohexane (Aldrich) at 100° C. These two dispersions were then mixed homogeneously and tested. High contrast black and white images were observed with a switching rate up to 10 Hz and a rising time of about 36 msec at 100 volts.

EXAMPLE 6

Sealing the Microcups by One-step Process 0.05 Ml of a UV curable composition comprising 1 wt % of benzyl dimethyl ketal (Esacure KB1™ from Sartomer) in HDDA (1,6-hexanediol diacrylate from Aldrich) was dispersed into 0.4 ml of a dielectric solvent comprising 0.5 wt % of 2,2,3,3,4,4,5,5,6,6,7,7,8,8,9,9,10,10,10-nonadecafluoro-1-decanol (Aldrich) in FC-43™ from 3M Company. The resultant dispersion was then immediately filled into an array of microcups as prepared in Example 2. Excess of fluid was scraped away by a wiper blade. The HDDA solution was allowed to phase separate for at least 30 seconds and cured by UV radiation (10 mw/cm$^2$) for about 1 minute. A hard, clear layer was observed on the top of the microcups and the microcups were sealed.

EXAMPLE 7

Sealing the Microcups by a Two-step (Overcoating and UV Curing) Process

The electrophoretic fluid prepared in Example 5 was coated onto the microcup array as prepared in Example 2. A thin layer of Norland optical adhesive NOA 60™ (Norland Products Inc., New Brunswick, N.J.) was coated onto the filled microcups. Any excess of the UV adhesive was scraped off by a strip of Mylar™ film and cleaned by a piece of absorbing paper. The overcoated adhesive was then cured immediately under a Loctite Zeta 7410™ UV exposure unit for about 15 minutes. The microcups were sealed completely and no air pocket was observed. The thickness of cured adhesive layer was about 5–10 microns as measured by a Mitutoyo thickness gauge.

EXAMPLE 8

Sealing the Microcups by a Two-step (Overcoating and Moisture Curing) Process

The experiment of Example 7 was repeated, except the Norland adhesive was replaced by Instant Krazy™ glue from Elmer's Products, Inc., Columbus, Ohio. The overcoated adhesive was then cured for 5 minutes by moisture in air. The microcups were sealed completely and no air pocket was observed. The thickness of cured adhesive layer was about 5–10 microns as measured by a Mitutoyo thickness gauge.

EXAMPLE 9

Sealing the Microcups by a Two-step (Overcoating and Interfacial Polymerization) Process The experiment of Example 8 was repeated, except the electrophoretic fluid was replaced by a 3,4-dichlorobenzotrifluoride solution containing 0.3 wt % of tetraethylenepentaamine (Aldrich) and the Instant Krazy™ glue was replaced by an aliphatic polyisocyanate (Desmodur™ N 3300 from Bayer Corp.) solution in anhydrous ether. A highly crosslinked thin film was observed almost immediately after overcoating. The dielectric solvent was completely sealed inside the microcups after the ether was evaporated at room temperature. No air pocket was observed.

EXAMPLE 10

Microcup Formulation

35 Parts by weight of Ebecryl™ 600 (UCB), 40 parts of SR-399™ (Sartomer), 10 parts of Ebecryl™ 4827 (UCB), 7 parts of Ebecryl™ 1360 (UCB), 8 parts of HDDA, (UCB), 0.05 parts of Irgacure™ 369 (Ciba Specialty Chemicals) and 0.01 parts of isopropyl thioxanthone (ITX from Aldrich) were mixed homogeneously and used for micro-embossing.

EXAMPLE 11

Preparation of Microcup Array

A primer solution comprising of 5 parts of Ebecryl™ 830, 2.6 parts of SR-399™ (from Sartomer), 1.8 parts of Ebecry™ 1701, 1 part of PMMA (Mw=350,000 from Aldrich), 0.5 parts of Irgacure™ 500, and 40 parts of methyl ethyl ketone (MEK) was coated onto a 2 mil ITO/PET film (60 ohm/sq., from Sheldahl Inc., MN) using a #3 Myrad bar, dried, and UV cured by using the Zeta 7410™ (5 w/cm$^2$, from Loctite) exposure unit for 15 minutes in air. The microcup formulation prepared in Example 10 was coated onto the treated ITO/PET film with a targeted thickness of about 50 µm, embossed with a Ni-Co male mold having a 60(length)×60 (width) µm repetitive protrusion square pattern with 25–50 µm protrusion height and 10 µm wide partition lines, UV cured from the PET side for 20 seconds, removed from the mold with a 2″ peeling bar at a speed of about 4–5 ft/min. Well-defined micro-cups with depth ranging from 25 to 50 µm were prepared by using male molds having corresponding protrusion heights. Microcup arrays of various dimension such as 70 (length)×70 (width)×35 (depth) ×10 (partition), 100 (L)×100(W)×35(D)×10(P), and 100 (L)×100(W)×30(D)×10(P) µm were also prepared by the same procedure.

EXAMPLE 12

Pigment Dispersion 6.42 Grams of a polymer coated TiO$_2$ particles PC-9003™ from Elimentis (Highstown, N.J.) were dispersed with a homogenizer into a solution containing 1.94 grams of Krytox™ (from Du Pont), 0.37 grams of a fluorinated copper phthalocyanine dye FC-3275™ (from 3M), and 52.54 grams of fluorinated solvent HT-200™ (from Ausimont).

EXAMPLE 13

Microcup Sealing

The electrophoretic fluid prepared in Example 12 was diluted with a volatile perfluoro co-solvent FC-33™ from 3M and coated onto the 70 (length)×70 (width)×35 (depth)×

10 (partition) microcup array prepared in Example 11. The volatile cosolvent was allowed to evaporate to expose a partially filled microcup array. A 7.5% solution of polyisoprene (97% cis, from Aldrich) in heptane was then overcoated onto the partially filled cups by a Universal Blade Applicator with an opening of 3 mil. The overcoated microcups were then dried at room temperature. A seamless sealing layer of about 7–8 $\mu$m thickness (dry) with acceptable adhesion and uniformity was formed on the microcup array. No observable entrapped air bubble in the sealed microcups was found under microscope. A second ITO/PET conductor precoated with an adhesive layer was laminated onto the sealed microcups. The electrophoretic cell showed satisfactory switching performance with good flexure resistance. No observable weight loss was found after being aged in a 66° C. oven for 5 days.

EXAMPLE 14–21

Microcup Sealing

The procedure of Example 13 is followed, except that the sealing layer was replaced by polyvinylbutyral (Butvar™ 72, from Solutia Inc., St. Louis, Mo.), thermpoplastic elastomers such as SIS (Kraton D1107™ from Kraton Polymers, Houston, Tex., 15% styrene), SBS (Kraton D1101™, 31% styrene), SEBS (Kraton G1650™ and FG1901™, 30% styrene), and EPDM (Vistalon 6505™ from ExxonMobil Chemical, Houston, Tex., 57% ethylene). The results are summarized in Table 3.

TABLE 3

Sealing Examples 14–21

| Example No. | Sealing Polymer | Coating solution | Estimated dry thickness | Cup dimension (L × W × D × P), um | Coating quality (visual) | Coating quality (Microscopic) |
|---|---|---|---|---|---|---|
| 14 | Polyisoprene (97% cis) | 7.5% in heptane | 7–8 um | 60 × 60 × 35 × 10 | good | good |
| 15 | Butvar 72 | 8.5% in isopropanol | 4–5 um | 60 × 60 × 35 × 10 | fair | fair |
| 16 | SIS (Kraton D1107 ™); 15% Styrene | 4% in Heptane | 4–5 um | 70 × 70 × 35 × 10 | good | good |
| 17 | SIS (Kraton D1107 ™); 15% Styrene | 4% in Heptane | 3–4 um | 100 × 100 × 30 × 10 | good | good |
| 18 | SBS (Kraton D1101 ™), 31% styrene | 10% in toluene/ heptane (20/80) | 4–5 um | 70 × 70 × 35 × 10 | good | good |
| 19 | SEBS (Kraton FG-1901 ™, 30% styrene, 1.5% maleic anhydride) | 10% in xylene/ Isopar E (5/95) | 4–5 um | 70 × 70 × 35 × 10 | good | good |
| 20 | SEBS (Kraton G1650 ™, 30% styrene) | 5% in toluene/ heptane (5/95) | 4–5 um | 70 × 70 × 35 × 10 | good | good |
| 21 | EPDM (Vistalon ™ 6505, 57% ethylene) | 10% in Isopar E | 4–5 um | 70 × 70 × 35 × 10 | good | good |

EXAMPLE 22

The procedure and formulation of Example 16 were repeated, except that the TiO$_2$ particles TINT-AYD® PC9003 were precoated with a basic copolymer (PVPyBMA) of 4-vinylpyridine (90%) and butyl methacrylate (10%) (Aldrich) by the procedure described below.

50 Parts of PC-9003 were dispersed into 25 parts of ethanol and 25 parts of a 10% solution of the PVPyBMA copolymer in methanol, homogenized for 5 minutes and then ultrasonicated for 10 minutes. The resultant slurry (12 parts) was added into 100 parts of a solution containing 1.2% of Krytox® 157FSH in HT-200™ and homogenized at room temperature (10 K speed) for 30 minutes. The alcohol was stripped off at 80° C. and the dispersion was further ultrasonicated for 30 minutes. A 0.8 wt % (based on dispersion) of blue dye FC-3275™ was added to the above dispersion, filled into the 70 (length)×70 (width)×35 (depth)×10 (partition) microcup array prepared in Example 11, and the filled microcups were sealed as Example 16. A seamless sealing layer of about 4–5 μm thickness (dry) with acceptable adhesion and uniformity was formed on the microcup array. No observable entrapped air bubble in the sealed microcups was found under microscope. A second ITO/PET conductor precoated with an adhesive layer was laminated onto the sealed microcups. The electrophoretic cell showed fair switching performance with good flexure resistance. No observable weight loss was found after being aged in a 66° C. oven for 5 days.

EXAMPLE 23

Synthesis of a Multifunctional Rf-Amine

Formula (I)

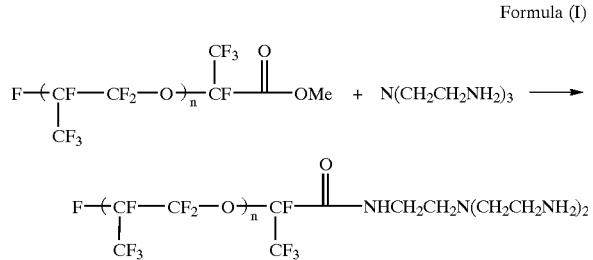

Krytox® methyl ester (17.8 g, MW=~1780, n=about 10, DuPont) was dissolved in a solvent mixture containing 12 g of 1,1,2-trichlorotrifluoroethane (Aldrich) and 1.5 g of α,α,α-trifluorotoluene (Aldrich). The resultant solution was added drop by drop into a solution containing 7.3 g of tris(2-aminoethyl)amine (Aldrich) in 25 g of α,α,α-trifluorotoluene and 30 g of 1,1,2-trichlorotrifluoroethane over 2 hours with stirring at room temperature. The mixture was then stirred for another 8 hours to allow the reaction to complete. The IR spectrum of the product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping (1 torr) at 100° C. for 4–6 hours. The crude product was then dissolved in 50 ml of PFS2™ solvent (low m.w. fluoropolyether from Ausimont) and extracted with 20 ml of ethyl acetate three times, then dried to yield 17 g of purified product (Rf-amine1900) which showed excellent solubility in HT200™.

Other multifunctional Rf amines of Formula (I) having different molecular weights such as Rf-amine4900 (n=about 30), 2000 (n=about 11), Rf-amine800 (n=about 4), and Rf-amine650 (n=about 3) were also synthesized according to the same procedure. Rf-amine350 was also prepared by the same procedure, except that the Krytox® methyl ester was replaced by $CF_3CF_2CF_2COOCH_3$ (from SynQuest Labs, Alachua, Fla.).

EXAMPLES 24

3.82 g of Desmodur® N3400 aliphatic polyisocyanate (BayerAG) and 1.87 g of Multranol® 9175 (Bayer AG) were dissolved in 4.2 g of MEK (methyl ethyl ketone). To the resulting solution, 6.94 g of $TiO_2$ R900™ (DuPont) were added and homogenized for 1 minute at room temperature, 0.15 g of a 2% dibutyltin dilaurate (Aldrich) solution in MEK were added, homogenized for 2 minutes, 26.70 g of a HT-200 solution containing 0.67 g of Rf-amine4900 (from Example 23) were added, homogenized for an additional minute, and the MEK was removed by vacuum at room temperature.

The slurry prepared above was emulsified slowly at room temperature by a homogenizer into 30 g of a HT-200™ solution containing 0.66 g of Rf-amine1900 (from Example 7), 1.3 g of Krytox® 157 FSL, 0.15 g of tris(2-aminoethyl) amine (Aldrich) and 0.40 g of 4-(aminomethyl)pyridine (Aldrich). The resulting microcapsule dispersion was heated at 80° C. for 2 hours with stirring to post cure the particles. The microcapsules were separated by centrifugal and redispersed in HT-200®.

An EPD fluid containing 1 wt % of fluorinated Cu phthalocyanine dye FC-3275™ (from 3M) and 8 wt % solid of the $TiO_2$ microcapsules in HT200™ was prepared, filled into the microcup array prepared in Example 11, and sealed as Example 16. A seamless sealing layer of about 4–5 μm thickness (dry) with acceptable adhesion and uniformity was formed on the microcup array. No observable entrapped air bubble in the sealed microcups was found under microscope. A second ITO/PET conductor precoated with an adhesive layer was laminated onto the sealed microcups. The electrophoretic cells showed satisfactory switching performance with good flexure resistance. No observable weight loss was found after being aged in a 66° C. oven for 2 days.

EXAMPLE 25

The procedure of Example 24 was followed, except that the sealing composition is replaced by a composition consisting of 8.0 parts of Kraton™ G1650, 0.9 parts of Kraton™ GRP 6919, 0.3 parts of Cab-O-Sil TS-720™ (from Cabot Corp., Tuscola, Ill., 0.46 parts of Multifunctional acrylate SR306™ (from Sartomer), 0.22 parts of SR9020™, 0.03 parts of Irgacure™ 369 (from Ciba), 0.09 parts of isopropylthioxanthone (ITX, from Aldrich), 81 parts of Isopar™ E (from ExxonMobil Chemical), and 9 parts of isopropyl acetate (from Aldrich). The sealed microcup array was post cure by UV for 5 minutes using a Loctite Zeta 7410™ exposure unit equipped with a metal fluoride lamp with an intensity of 80 mW/cm$^2$ at 365 nm. The electrophoretic cells showed satisfactory switching performance with good flexure resistance. No observable weight loss was found after being aged in a 66° C. oven for 2 days.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display comprising a plurality of cells, each cell:
    a) being defined by side walls, the side walls having a side surface and a top surface;
    b) being filled with an electrophoretic fluid comprising charged particles dispersed in a dielectric solvent or solvent mixture, with the top surface of the side walls being at least about 0.01μ above the top surface of the electrophoretic fluid; and
    c) being individually sealed with a polymeric sealing layer;

i) which is in intimate contact with and forms a contiguous film on the fluid;

ii) which is in intimate contact with the side surface of the side walls of the cell above the fluid; and iii) which is in intimate contact with the top surface of the side walls of the cell.

2. The electrophoretic display of claim 1 wherein said polymeric sealing layer forms a contiguous film on the top of the sealed cells.

3. The electrophoretic display of claim 1 wherein said sealing layer is formed from a composition comprising a material selected from the group consisting of polyvalent acrylate or methacrylate, cyanoacrylates, polyvalent vinyl, polyvalent epoxide, polyvalent isocyanate, polyvalent allyl, and oligomers or polymers containing crosslinkable functional groups.

4. The electrophoretic display of claim 3 wherein said composition further comprises an additive selected from the group consisting of surfactants, antioxidants, initiators, catalysts, crosslinkers, thickeners, polymer binders, pigments, dyes and fillers.

5. The electrophoretic display of claim 3 wherein said filler is selected from the group consisting of silica, $CaCO_3$, $BaSO_4$, $TiO_2$, metal particles, metal oxides, and carbon black.

6. The electrophoretic display of claim 1 wherein the top surface of said side walls is about $0.02\mu$ to about $15\mu$ above the top surface of the electrophoretic fluid.

7. The electrophoretic display of claim 6 wherein the top surface of said side walls is about $0.1\mu$ to about $4\mu$ above the top surface of the electrophoretic fluid.

8. The electrophoretic display of claim 1 wherein the top surface of said sealing layer is at least about $0.01\mu$ above the top surface of said side walls.

9. The electrophoretic display of claim 8 wherein the top surface of said sealing layer is about $0.01\mu$ to about $50\mu$ above the top surface of said side walls.

10. The electrophoretic display of claim 9 wherein the top surface of said sealing layer is about $0.5\mu$ to about $8\mu$ above the top surface of said side walls.

11. The electrophoretic display of claim 1 wherein said sealing layer has a thickness in the range of from about $0.1\mu$ to about $50\mu$ as measured in the center of said cell.

12. The electrophoretic display of claim 11 wherein said sealing layer has a thickness in the range of from about $0.5\mu$ to about $15\mu$ as measured in the center of said cell.

13. The electrophoretic display of claim 12 wherein said sealing layer has a thickness in the range of from about $1\mu$ to about $8\mu$ as measured in the center of said cell.

14. An electrophoretic display which comprises:

a) two electrode plates;

b) an array of cells, each cell:

i) being defined by side walls, the side walls having a side surface and a top surface;

ii) being filled with an electrophoretic fluid comprising charged particles dispersed in a dielectric solvent or solvent mixture, with the top surface of the side walls being at least about $0.01\mu$ above the top surface of the electrophoretic fluid; and iii) being individually sealed with a polymeric sealing layer:

A) which is in intimate contact with and forms a contiguous film on the fluid;

B) which is in intimate contact with the side surface of the side walls of the cell above the fluid; and C) which is in intimate contact with the top surface of the side walls of the cell.

15. The electrophoretic display of claim 14 further comprising an adhesive layer between the top of said polymeric sealing layer and one of said electrode plates.

16. The electrophoretic display of claim 15 wherein said polymeric sealing layer is formed from a composition comprising a material selected from the group consisting of polyvalent acrylate or methacrylate, cyanoacrylates, polyvalent vinyl, polyvalent epoxide, polyvalent isocyanate, polyvalent allyl, and oligomers or polymers containing crosslinkable functional groups.

17. The electrophoretic display of claim 16 wherein said composition further comprises one or more additive selected from the group consisting of surfactants, antioxidants, initiators, catalysts, crosslinkers, thickeners, polymer binders, pigments, dyes and fillers.

18. The electrophoretic display of claim 17 wherein said filler is selected from the group consisting of silica, $CaCO_3$, $BaSO_4$, $TiO_2$, metal particles, metal oxides, and carbon black.

19. The electrophoretic display of claim 15 wherein said adhesive layer is a pressure sensitive adhesive, a hot melt adhesive, a heat, moisture, or radiation curable adhesive.

20. The electrophoretic display of claim 19 wherein said adhesive layer is formed from a material selected from a group consisting of acrylics, styrene-butadiene copolymers, styrene-butadiene-styrene block coplymers, styrene-isoprene-styrene block copolymers, polyvinylbutyal, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers, and copolymers.

21. The electrophoretic display of claim 15 wherein said sealing layer and said adhesive layer are formed from the same material.

22. The electrophoretic display of claim 21 wherein said material is a radiation curable material.

23. The electrophoretic display of claim 15 wherein said sealing layer and said adhesive layer are formed from different materials.

24. The electrophoretic display of claim 14 wherein the top surface of said side walls is about $0.02\mu$ to about $15\mu$ above the top surface of the electrophoretic fluid.

25. The electrophoretic display of claim 24 wherein the top surface of said side walls is about $0.1\mu$ to about $4\mu$ above the top surface of the electrophoretic fluid.

26. The electrophoretic display of claim 14 wherein the top surface of said sealing layer is at least about $0.01\mu$ above the top surface of said side walls.

27. The electrophoretic display of claim 26 wherein the top surface of said sealing layer is about $0.01\mu$ to about $50\mu$ above the top surface of said side walls.

28. The electrophoretic display of claim 27 wherein the top surface of said sealing layer is about $0.5\mu$ to about $8\mu$ above the top surface of said side walls.

29. The electrophoretic display of claim 14 wherein said sealing layer has a thickness in the range of from about $0.1\mu$ to about $50\mu$ as measured in the center of said cell.

30. The electrophoretic display of claim 29 wherein said sealing layer has a thickness in the range of from about $0.5\mu$ to about $15\mu$ as measured in the center of said cell.

31. The electrophoretic display of claim 30 wherein said sealing layer has a thickness in the range of from about $1\mu$ to about $8\mu$ as measured in the center of said cell.

32. The electrophoretic display of claim 1 wherein said polymeric sealing layer is formed from a sealing composition having a specific gravity lower than that of the electrophoretic fluid.

33. The electrophoretic display of claim 32 wherein said sealing composition is a UV curable composition.

34. The electrophoretic display of claim 32 wherein said sealing composition comprises a thermoplastic or thermoset precursor.

35. The electrophoretic display of claim 14 wherein said polymeric sealing layer is formed from a sealing composition having a specific gravity lower than that of the electrophoretic fluid.

36. The electrophoretic display of claim 35 wherein said sealing composition is a UV curable composition.

37. The electrophoretic display of claim 35 wherein said sealing composition comprises a thermoplastic or thermoset precursor.

* * * * *